United States Patent
Kwak et al.

(10) Patent No.: US 11,418,332 B2
(45) Date of Patent: Aug. 16, 2022

(54) SECURITY DEVICE INCLUDING PHYSICAL UNCLONABLE FUNCTION CELLS AND OPERATION METHOD THEREOF

(71) Applicant: SAMSUNG ELECTRONICS CO., LTD., Suwon-si (KR)

(72) Inventors: Sung Ung Kwak, Suwon-si (KR); Sungkyoung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 16/813,229

(22) Filed: Mar. 9, 2020

(65) Prior Publication Data
US 2020/0396069 A1    Dec. 17, 2020

(30) Foreign Application Priority Data
Jun. 12, 2019 (KR) .................. 10-2019-0069461

(51) Int. Cl.
*H04L 29/06* (2006.01)
*H04L 9/08* (2006.01)
*H04L 9/32* (2006.01)

(52) U.S. Cl.
CPC .......... *H04L 9/0866* (2013.01); *H04L 9/3278* (2013.01)

(58) Field of Classification Search
CPC . H04L 9/0866; H04L 9/3278; H04L 2209/12; H04L 9/0863; G06F 21/72
See application file for complete search history.

(56) References Cited

U.S. PATENT DOCUMENTS

| 8,848,477 | B2 | 9/2014 | Schrijen et al. |
| 9,485,094 | B1* | 11/2016 | Parvarandeh ......... H04L 9/0866 |
| 9,537,653 | B2 | 1/2017 | Komano |
| 10,164,640 | B1 | 12/2018 | Lu et al. |
| 10,243,749 | B2* | 3/2019 | Park .......................... G09C 1/00 |
| 10,459,845 | B1* | 10/2019 | Cariello .................. G06F 12/10 |
| 10,872,010 | B2* | 12/2020 | Mondello ......... B60W 50/0205 |
| 2017/0132434 | A1 | 5/2017 | Wang et al. |
| 2018/0076957 | A1* | 3/2018 | Watanabe ............... G06F 7/588 |
| 2018/0159685 | A1* | 6/2018 | Kwak ................... H04L 9/0866 |
| 2019/0026724 | A1* | 1/2019 | Wade ................... H04L 9/0866 |
| 2019/0116052 | A1 | 4/2019 | Kim et al. |
| 2020/0014547 | A1* | 1/2020 | Lu ........................... G06F 21/75 |

FOREIGN PATENT DOCUMENTS

KR    10-1359783 B1    2/2014

* cited by examiner

*Primary Examiner* — Carl G Colin
*Assistant Examiner* — Andrew Suh
(74) *Attorney, Agent, or Firm* — Volentine, Whitt & Francos, PLLC

(57) ABSTRACT

An operation method of a security device which includes a plurality of physical unclonable function (PUF) cells includes selecting a target PUF cell of the plurality of PUF cells, selecting at least two reference PUF cells of the plurality of PUF cells based on a sorted list, reading a plurality of sensing data from the target PUF cell and the at least two reference PUF cells, and determining a target bit corresponding to the target PUF cell based on the plurality of sensing data to output the determined target bit.

14 Claims, 23 Drawing Sheets

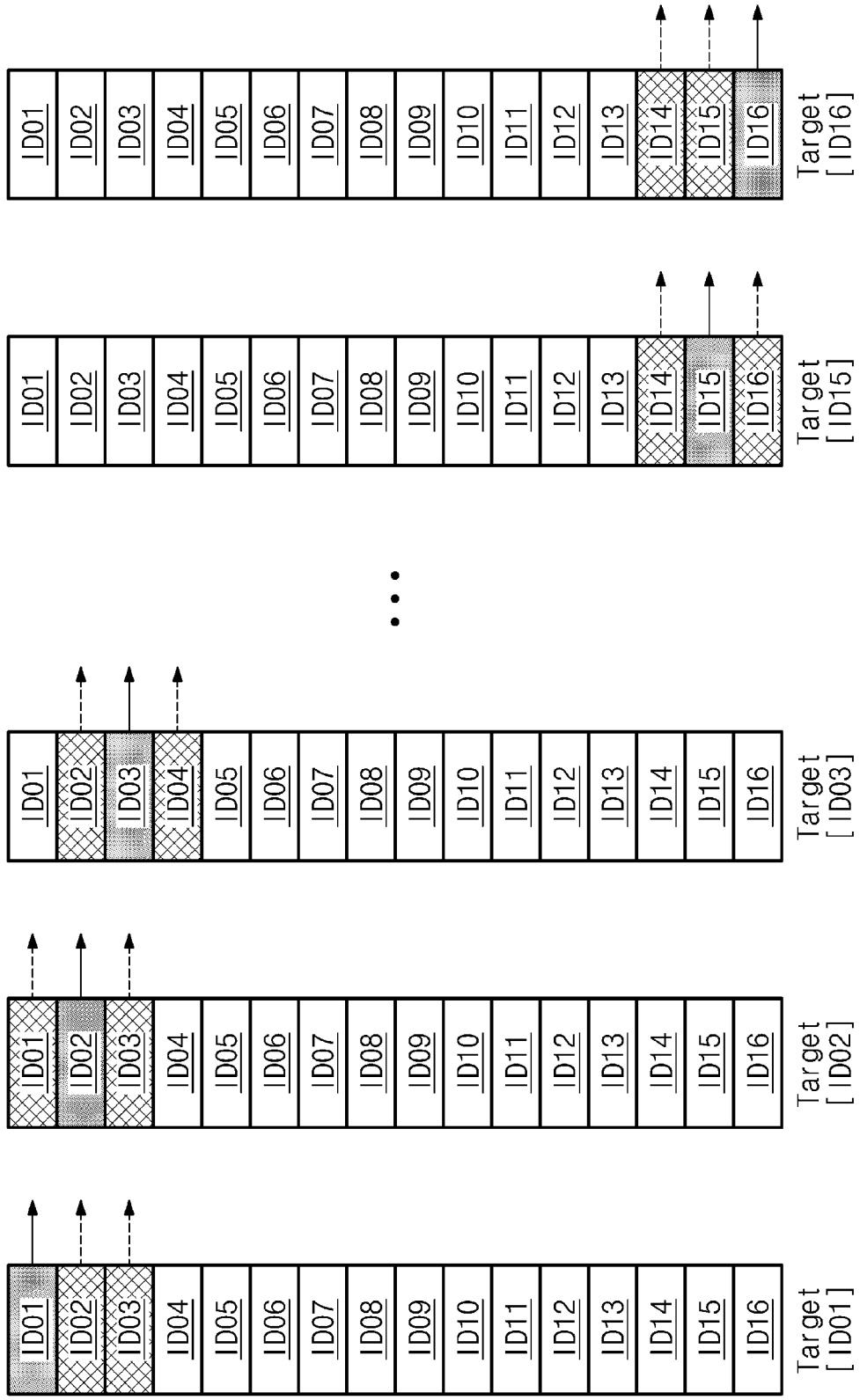

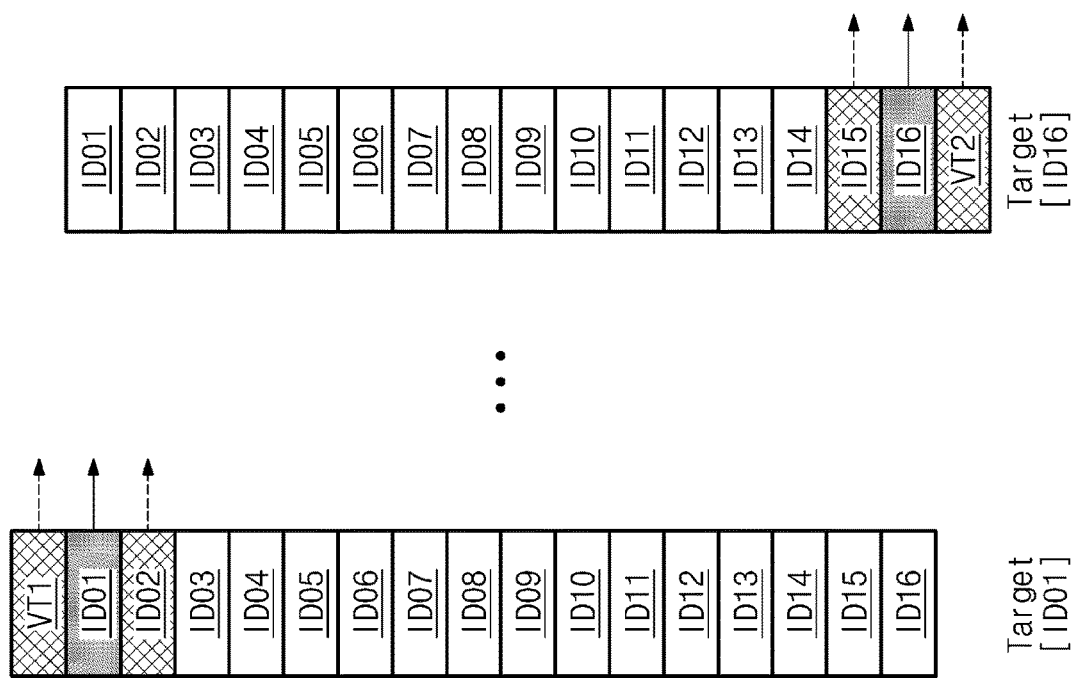

SECURITY DEVICE INCLUDING PHYSICAL UNCLONABLE FUNCTION CELLS AND OPERATION METHOD THEREOF

CROSS-REFERENCE TO RELATED APPLICATIONS

A claim for priority under 35 U.S.C. § 119 is made to Korean Patent Application No. 10-2019-0069461 filed on Jun. 12, 2019, in the Korean Intellectual Property Office, the entirety of which is hereby incorporated by reference

BACKGROUND

The present disclosure relates to security devices, and more particularly to security device including physical unclonable function (PUF) cells and operation methods thereof.

Security and encryption technologies have become of increased importance with regard to communication and mobile devices. Because software generated keys may be revealed through hacking, hardware-based security measures are currently being developed.

For example, semiconductor devices having a physical unclonable function (PUF) are being being developed. The PUF refers to a function or device that generates a unique key randomly depending on process, voltage, and temperature (PVT) variations of a semiconductor device. However, because the PUF generates a random key depending on the PVT variations, an error may occur in a key depending on various environment factors. This error causes reduction of reliability of the semiconductor device or the security device utilizing the PUF.

SUMMARY

Embodiments of the inventive concepts provide a security device including PUF cells having an improved reliability and an operation method thereof.

Embodiments of the inventive concepts provide an operation method of a security device including a controller and a plurality of physical unclonable function (PUF) cells. The method includes the controller selecting a target PUF cell from among the plurality of PUF cells, selecting at least two reference PUF cells other than the target PUF cell from among the plurality of PUF cells based on a sorted list of the plurality of PUF cells, reading a plurality of sensing data from the target PUF cell and the at least two reference PUF cells, determining a target bit corresponding to the target PUF cell based on the plurality of sensing data to provide a determined target bit, and generating a security key based on the determined target bit.

Embodiments of the inventive concepts further provide an operation method of a security device including a controller and a plurality of physical unclonable function (PUF) cells. The method includes the controller reading raw data from each of the plurality of PUF cells, generating a sorted list by sorting physical addresses respectively associated with the plurality of PUF cells in an order of size of the raw data and storing the sorted list, selecting a target PUF cell of the plurality of PUF cells, selecting at least two reference PUF cells corresponding to the target PUF cell based on the sorted list, reading a plurality of sensing data from the target PUF cell and the at least two reference PUF cells, determining a target bit corresponding to the target PUF cell based on the plurality of sensing data, and generating a security key based on the determined target bit.

Embodiments of the inventive concepts still further provide a security device including a PUF cell array that includes a plurality of physical unclonable function (PUF) cells, and a controller that controls the plurality of PUF cells. The controller includes a memory that stores a sorted list including physical addresses for the plurality of PUF cells, a window controller that selects a target PUF cell from among the plurality of PUF cells and selects at least two PUF cells corresponding to the target PUF cell from among the plurality of PUF cells based on the sorted list, a PUF cell controller that controls the target PUF cell and the at least two reference PUF cells, a receiver that receives a plurality of sensing data from the target PUF cell and the at least two reference PUF cells, and a bit determiner that receives the plurality of sensing data from the receiver and determines a target bit corresponding to the target PUF cell based on the plurality of sensing data.

Embodiments of the inventive concepts also provide a security device including a PUF cell array including a plurality of physical unclonable function (PUF) cells; and a controller configured to read raw data from each of the plurality of PUF cells, generate a sorted list by sorting physical addresses respectively associated with the plurality of PUF cells, apply a window to the sorted list including a target PUF cell and at least two reference PUF cells other than the target PUF cell from among the plurality of PUF cells, read a plurality of sensing data from the target PUF cell and the at least two reference PUF cells, determine a target bit corresponding to the target PUF cell based on the plurality of sensing data, and generate a security key based on the target bit.

BRIEF DESCRIPTION OF THE FIGURES

The above and other objects and features of the inventive concepts will become apparent in view of the following detailed description of example embodiments made with reference to the accompanying drawings.

FIGS. 7A, 7B and 7C are diagrams descriptive of methods in which a window controller of FIG. 3 selects a reference PUF cell.

DETAILED DESCRIPTION

Figure 1:
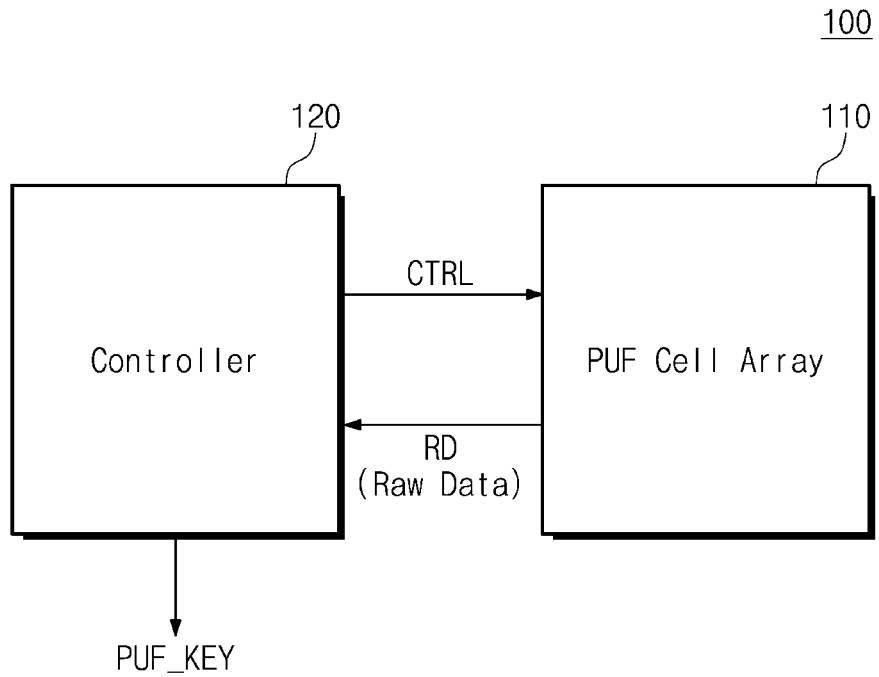
FIG. 1 is a block diagram illustrating a security device according to an embodiment of the inventive concepts.

Hereinafter, embodiments of the inventive concepts are described in detail and clearly to such an extent that one of ordinary skill may easily implement the inventive concepts.

As is traditional in the field of the inventive concepts, embodiments may be described and illustrated terms of "parts", "units", "modules", etc. and blocks illustrated in the drawings which carry out a described function or functions, and which may be implemented in the form of software, hardware, or a combination thereof. In embodiments, the software for example may be machine code, firmware, embedded code, and/or application software. For example, the hardware may include electrical circuits, electronic circuits, processors, computers, integrated circuits, integrated circuit cores, pressure sensors, inertial sensors, microelectromechanical systems (MEMS), passive elements, or combinations thereof.

Also, unless differently defined, all terms used herein, which include technical terminologies or scientific terminologies, have the same meaning as that understood by a person skilled in the art to which the inventive concepts belong. Terms defined in a generally used dictionary are to be interpreted to have meanings equal to the contextual meanings in a relevant technical field, and are not interpreted to have ideal or excessively formal meanings unless clearly defined in the specification.

FIG. 1 is a block diagram illustrating a security device according to an embodiment of the inventive concepts. Referring to FIG. 1, a security device 100 may include a physical unclonable function (PUF) cell array 110 and a controller 120.

The PUF cell array 110 may include a plurality of PUF cells. In an example embodiment, the PUF cell array 110 may include at least one of various kinds of PUF cells such as a PUF cell based on a threshold voltage of a transistor, an arbiter-based PUF cell (e.g., a feed-forward PUF cell, an XOR PUF cell in which arbiter PUF cells are arranged in parallel, or a lightweight PUF cell), a ring oscillator-based PUF cell, a memory-based PUF cell (e.g., a static random access memory (SRAM) PUF cell, a latch PUF cell, a flash memory PUF cell, or a memistor PUF cell), and a PUF cell reconfigurable according to a laser beam or a thermal variation. Hereinafter, to assist in description of the technical idea of the inventive concepts, it is assumed that each of the plurality of PUF cells is a PUF cell based on a threshold voltage of a transistor. However, the inventive concepts are not limited thereto. For example, each of the plurality of PUF cells may be implemented with various types of PUF cells.

The plurality of PUF cells may have different process, voltage and temperature (PVT) variations. Each of the plurality of PUF cells may be configured to output raw data RD according to the PVT variation corresponding thereto. For example, even though the plurality of PUF cells are manufactured by the same semiconductor processes or on a same wafer, the plurality of PUF cells may have different PVT variations due to various factors. The raw data RD may correspond to mismatch information (e.g., Vgs mismatch) of each PUF cell, which is generated by various factors such as doping concentration, thickness of a gate oxide layer, and geometric structure.

That is, even though a first PUF cell and a second PUF cell are manufactured by the same semiconductor processes or on a same wafer, raw data of the first PUF cell may have a positive polarity, while raw data of the second PUF cell may have a negative polarity. Alternatively, an absolute value of the raw data of the first PUF cell may be relatively greater than an absolute value of the raw data of the second PUF cell.

In an example embodiment, the raw data RD of each of the plurality of PUF cells may be measured or detected by using a separate sensing device or a separate test device.

The controller 120 may obtain the raw data RD from the PUF cell array 110. For example, the controller 120 may provide the PUF cell array 110 with a control signal CTRL for obtaining the raw data RD from each of the plurality of PUF cells included in the PUF cell array 110. The PUF cell array 110 may output the raw data RD of a corresponding PUF cell or PUF cells in response to the control signal CTRL.

The controller 120 may be configured to generate a security key PUF_KEY based on the raw data RD obtained from the plurality of PUF cells. For example, the controller 120 may determine a polarity of the raw data RD and may generate the security key PUF_KEY based on the determined polarity. In an example embodiment, the security key PUF_KEY may include a plurality of bits, and the plurality of bits may correspond to the plurality of PUF cells in the PUF cell array 110, respectively. In an example embodiment, the security key PUF_KEY may be a combination of target bits respectively corresponding to the plurality of PUF cells. In an example embodiment, the number of bits included in the security key PUF_KEY may be different from the number of PUF cells included in the PUF cell array 110.

In an example embodiment, because the plurality of PUF cells have different PVT variations, polarities of the raw data RD read from particular PUF cells may be changed by various ambient factors (e.g., an operating temperature, an operating time, and an operating voltage). In this case, the respective bits that are determined with regard to the particular PUF cells may vary, thereby causing reduction of reliability of the security key PUF_KEY.

The security device 100 according to an embodiment of the inventive concepts may improve the reliability of the security key PUF_KEY by using a rule that is determined in advance. A configuration and an operation of the security device 100 according to an embodiment of the inventive concepts will be more fully described with reference to the following drawings.

Figure 2:
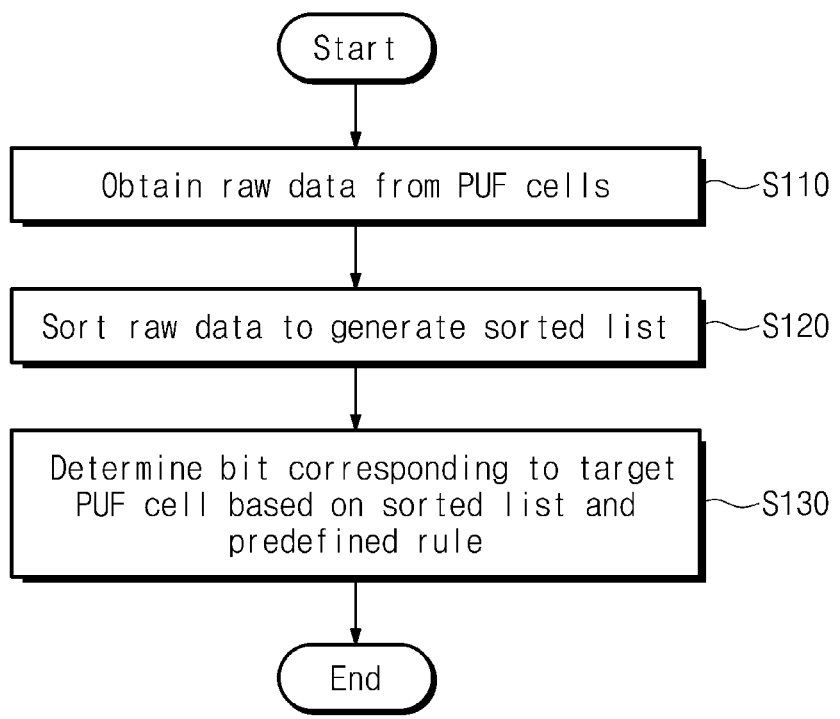
FIG. 2 is a flowchart illustrating an operation of a controller of FIG. 1.

FIG. 2 is a flowchart illustrating an operation of a controller of FIG. 1. Referring to FIGS. 1 and 2, in operation S110, the controller 120 obtains the raw data RD from each of the plurality of PUF cells. For example, the controller 120 may obtain the raw data RD associated with all the PUF cells. In an example embodiment, the raw data RD may indicate information (e.g., mismatch information) obtained from each of the plurality of PUF cells in a process of manufacturing or testing the security device 100.

In operation S120, the controller 120 sorts the raw data RD to generate a sorted list. For example, the controller 120 may manage information (e.g., PUF cell address information) about each of the plurality of PUF cells and the raw data RD obtained from each of the plurality of PUF cells in the form of a list. The controller 120 may generate a sorted list LT_s by sorting the raw data RD and the PUF cell address information in the order of size of the raw data RD.

In operation S130, the controller 120 determines a target bit TB corresponding to a target PUF cell, based on the predetermined rule and the sorted list LT_s. In an example embodiment, the controller 120 may select two or more reference PUF cells by applying a variable window to the sorted list LT_s and may determine the target bit TB corresponding to the target PUF cell based on the data obtained from the selected reference PUF cells and the target PUF cell. Alternatively, the controller 120 may select a reference value corresponding to the target PUF cell from among a plurality of reference values and may determine the target bit TB corresponding to the target PUF cell based on the data obtained from the selected reference value and the target PUF cell. An operation of a controller according to an embodiment of the inventive concepts will be more fully described with reference to drawings below.

Figure 3:
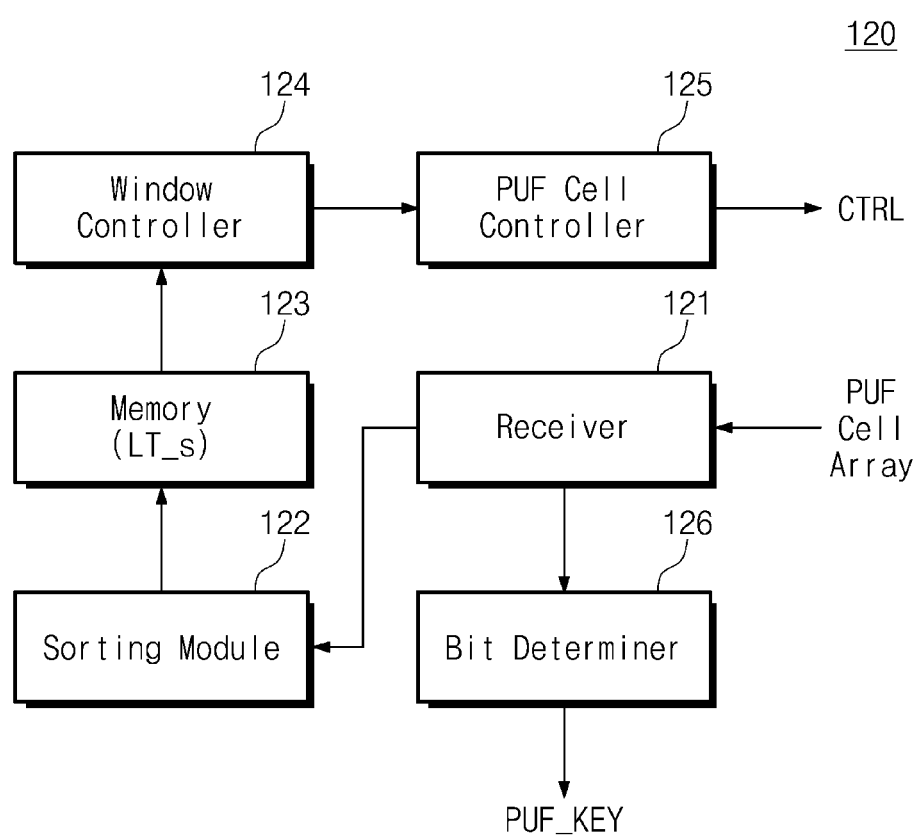
FIG. 3 is a block diagram illustrating a controller of FIG. 1.

FIG. 3 is a block diagram illustrating a controller of FIG. 1. The controller 120 may include a receiver 121, a sorting module (or circuit) 122, a memory 123, a window controller 124, a PUF cell controller 125, and a bit determiner 126.

For example, the receiver 121 may receive the raw data RD from each of the plurality of PUF cells. In an example embodiment, the raw data RD received from each of the plurality of PUF cells may be a value of an analog form (e.g., a mismatch value associated with various parameters of each PUF cell). The receiver 121 may be an analog-to-digital converter (ADC) configured to convert the raw data RD from an analog form to a digital form.

Hereinafter, to assist in description of the technical idea of the inventive concepts, a value that is read from a PUF cell is referred to as "raw data" or "sensing data". The raw data may indicate data (e.g., a mismatch value) read from PUF cells for the purpose of generating particular information (e.g., a sorted PUF list) in the process of manufacturing or testing the security device 100. The sensing data may indicate data read from PUF cells for the purpose of generating the security key PUF_KEY by using the security device 100. Reading raw data or sensing data from PUF cells may mean obtaining raw data or sensing data corresponding to each PUF cell. However, these terms are used to aid in description of the technical idea of the inventive concepts y, and the inventive concepts are not limited thereto.

The sorting module 122 may receive the raw data RD from the receiver 121. The sorting module 122 may collect the raw data RD associated with each of the plurality of PUF cells included in the PUF cell array 110. The sorting module 122 may sort the collected raw data RD in a given order (e.g., in the order of size of raw data). For example, a value of the raw data RD of each PUF cell may vary depending on a PVT variation of each PUF cell. The sorting module 122 may sort the collected data in the order of size of the raw data RD.

In an example embodiment, values sorted by the sorting module 122 are referred to as a "sorted list LT_s". In an example embodiment, the sorted list LT_s may include information of PUF cells (e.g., address information of the PUF cells) sorted depending on a particular condition (e.g., the order of size of raw data). In an example embodiment, the sorted list LT_s may be stored in the memory 123. In an example embodiment, the memory 123 may be a nonvolatile memory.

The window controller 124 may select PUF cells based on the sorted list LT_s stored in the memory 123. For example, the window controller 124 may select PUF cells based on a given window. In detail, the window controller 124 may apply the given window to the sorted list LT_s to select reference PUF cells corresponding to a target PUF cell. In an example embodiment, the number of reference PUF cells may be 2 or more.

In an example embodiment, the given window may be determined by various factors such as window size, window direction, and skip size. In an example embodiment, a window may be differently determined depending on a target PUF cell or a logical location of the target PUF cell. The logical location of the target PUF cell may indicate a location or an order of the target PUF cell in the sorted list LT_s.

The PUF cell controller 125 may generate the control signal CTRL such that sensing data are read from PUF cells (e.g., a target PUF cell and reference PUF cells) selected by the window controller 124.

The PUF cell array 110 may output sensing data associated with corresponding PUF cells (i.e., a target PUF cell and reference PUF cells) in response to the control signal CTRL from the PUF cell controller 125.

The receiver 121 may receive the sensing data from the PUF cell array 110 and may provide the received sensing data to the bit determiner 126. In an example embodiment, the receiver 121 may convert the sensing data to a digital value and may provide the converted value to the bit determiner 126.

The bit determiner 126 may determine the target bit TB corresponding to the target PUF cell (i.e., at least one target bit TB included in the security key PUF_KEY), based on the received sensing data (i.e., the sensing data associated with the target PUF cell and the reference PUF cells). For example, the bit determiner 126 may generate determination data by performing a given operation on the sensing data and may determine the target bit TB corresponding to the target PUF cell based on the generated determination data. Alternatively, the bit determiner 126 may generate pre-bits associated with the sensing data and may determine the target bit TB corresponding to the target PUF cell based on the generated pre-bits. A configuration and an operation of the bit determiner 126 will be more fully described with reference to FIGS. 10A, 10B, 11A, and 11B.

Figure 4:
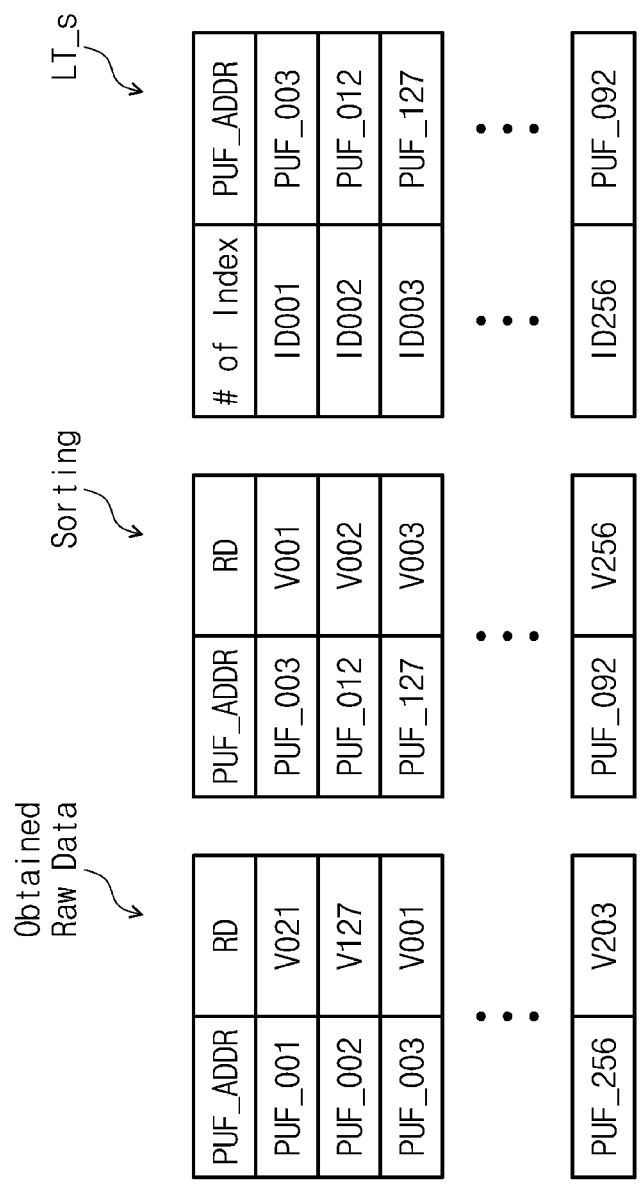
FIG. 4 is a diagram descriptive of a sorted list stored in a memory of FIG. 3.
Figure 5:
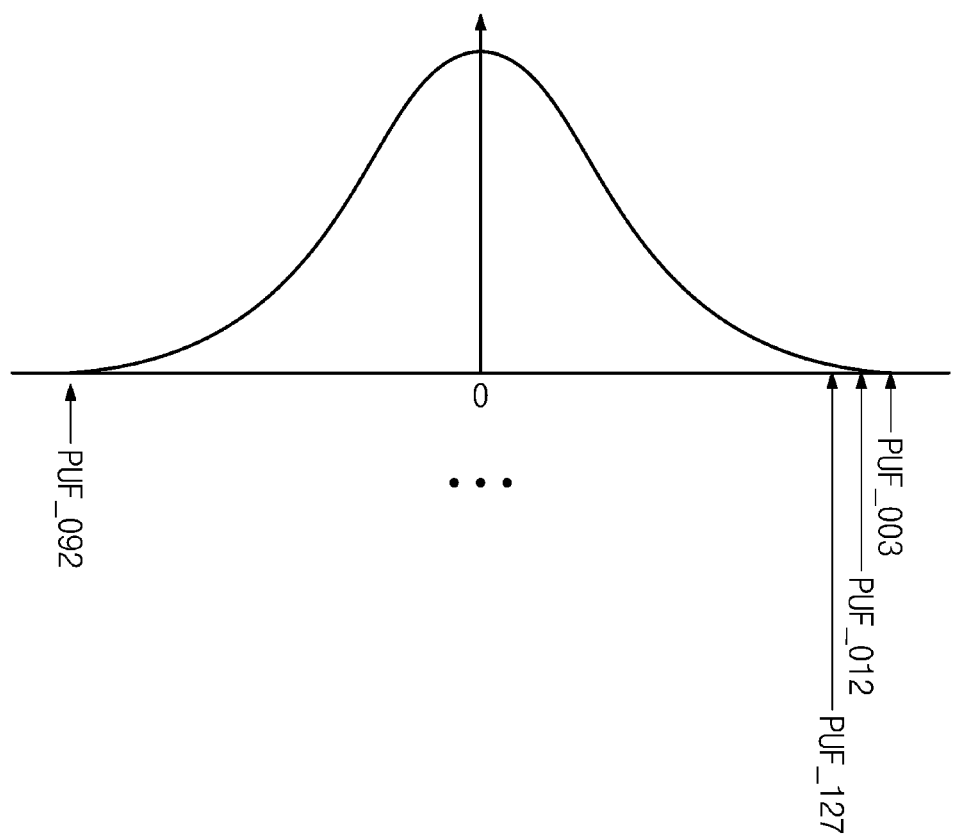
FIG. 5 is a distribution diagram descriptive of how to generate a sorted list of FIG. 4.

FIG. 4 is a diagram descriptive of a sorted list stored in a memory of FIG. 3. FIG. 5 is a distribution diagram descriptive of how to generate a sorted list of FIG. 4. In an example embodiment, FIG. 5 shows a distribution of raw data of respective PUF cells of the PUF cell array 110. In FIG. 5, a horizontal axis represents the size of raw data, and a vertical axis represents the number of PUF cells.

Hereinafter, to assist in description of the technical idea of the inventive concepts, the sorted list LT_s according to an embodiment of the inventive concepts will be described with respect to particular reference numerals. Also, it is assumed that the PUF cell array 110 includes 256 PUF cells PUF_001 to PUF_256. However, the inventive concepts are not limited thereto.

Referring to FIGS. 3 and 4, the controller 120 may receive raw data (RD) V001 to V256 respectively associated with the PUF cells from the PUF cell array 110. The obtained raw data RD as shown in FIG. 4 are corresponded to address information PUF_ADDR indicated by PUF_001 to PUF_256. Hereinafter, a certain PUF cell may be identified by its PUF_ADDR. For example, 21st raw data V021 may be read from a first PUF cell PUF_001, 127th raw data V127 may be read from a second PUF cell PUF_002, first raw data V001 may be read from a third PUF cell PUF_003, and 203rd raw data V203 may be read from a 256th PUF cell PUF_256.

In an example embodiment, the address information PUF_ADDR includes reference numerals that may indicate the address information of the plurality of PUF cells, respectively. That is, a reference numeral of the address information PUF_ADDR of a PUF cell is used simply to distinguish the PUF cell from other PUF cells, and the inventive concepts are not limited thereto.

In an example embodiment, reference numerals of the raw data V001 to V256 read from the plurality of PUF cells PUF_001 to PUF_256 may mean relative sizes of raw data. That is, the first raw data V001 may be greater than or equal to the second raw data V002, and the 256th raw data V256 may be smaller than or equal to the 255th raw data V255. For example, a value of the first raw data V001 may be greater than or equal to a value of the second raw data V002, and a value of the 256th raw data V256 may be smaller than or equal to a value of the 255th raw data V255. However, it should be understood that the reference numerals are used to assist in description of the technical idea of the inventive concepts, and the inventive concepts are not limited to the above described reference numerals.

The controller 120 may collect raw data and information about PUF cells (e.g., address information of PUF cells). The controller 120 may sort the collected information in a given order. For example, the controller 120 may sort the collected information in the order of size of raw data. In detail, as illustrated in FIG. 4, the third PUF cell PUF_003 may correspond to the first raw data V001, the 12th PUF cell PUF_012 may correspond to the second raw data V002, the 127th PUF cell PUF_127 may correspond to the third raw data V003, and the 92th PUF cell PUF_092 may correspond to the 256th raw data V256. In this case, the controller 120 may sort the collected information in the order of PUF_003, PUF_012, PUF_127 . . . PUF_092 (i.e., the order of relative size of raw data).

In other words, as illustrated in FIG. 5, the third PUF cell PUF_003 may have the greatest raw data (e.g., V001) from among raw data of the plurality of PUF cells. Raw data (e.g., V002) of the 12th PUF cell PUF_012 may be smaller than or equal to raw data (e.g., V001) of the third PUF cell PUF_003. Raw data (e.g., V003) of the 127th PUF cell PUF_127 may be smaller than or equal to raw data (e.g., V002) of the 12th PUF cell PUF_012. The raw data (e.g., V256) of the 92nd PUF cell PUF_092 may be the smallest raw data. That is, the controller 120 may generate the sorted list LT_s by sorting a plurality of PUF cells in the order of size of raw data.

The sorted list LT_s generated by the controller 120 is exemplified in FIG. 4. For example, the sorted list LT_s may include information about PUF cells (e.g., address information of the PUF cells) sorted in the order of size of raw data of a plurality of PUF cells. However, in an embodiment the sorted list LT_s as shown in the third table of FIG. 4 does not include information about the raw data RD. That is, because the sorted list LT_s as shown includes only information about a plurality of PUF cells, even though the sorted list LT_s may be leaked out or revealed by an external attacker, it may be impossible to generate a security key by using the sorted list LT_s.

In an example embodiment, the sorted list LT_s may include index information ID001 to ID256 assigned to a plurality of PUF cells, respectively. The index information ID001 to ID256 may indicate logical locations or orders in the sorted list LT_s. Hereinafter, to assist in description of the technical idea of the inventive concepts, embodiments of the inventive concepts will be described based on the index information ID001 to ID256 of the sorted list LT_s.

In an embodiment described hereinafter, the term "PUF cell of a particular index" may mean a corresponding PUF cell. For example, in the sorted list LT_s of FIG. 4, a PUF cell of the first index ID001 may indicate the corresponding third PUF cell PUF_003, a PUF cell of the second index ID002 may indicate the corresponding 12th PUF cell PUF_012, a PUF cell of the third index ID003 may indicate the corresponding 127th PUF cell PUF_127, and a PUF cell of the 256th index ID256 may indicate the corresponding 92th PUF cell PUF_092. That is, the index information may be used to assist in description of embodiments, but the inventive concepts are not limited thereto. In an example embodiment, the sorted list LT_s may not include separate index information (ID).

Figure 6:
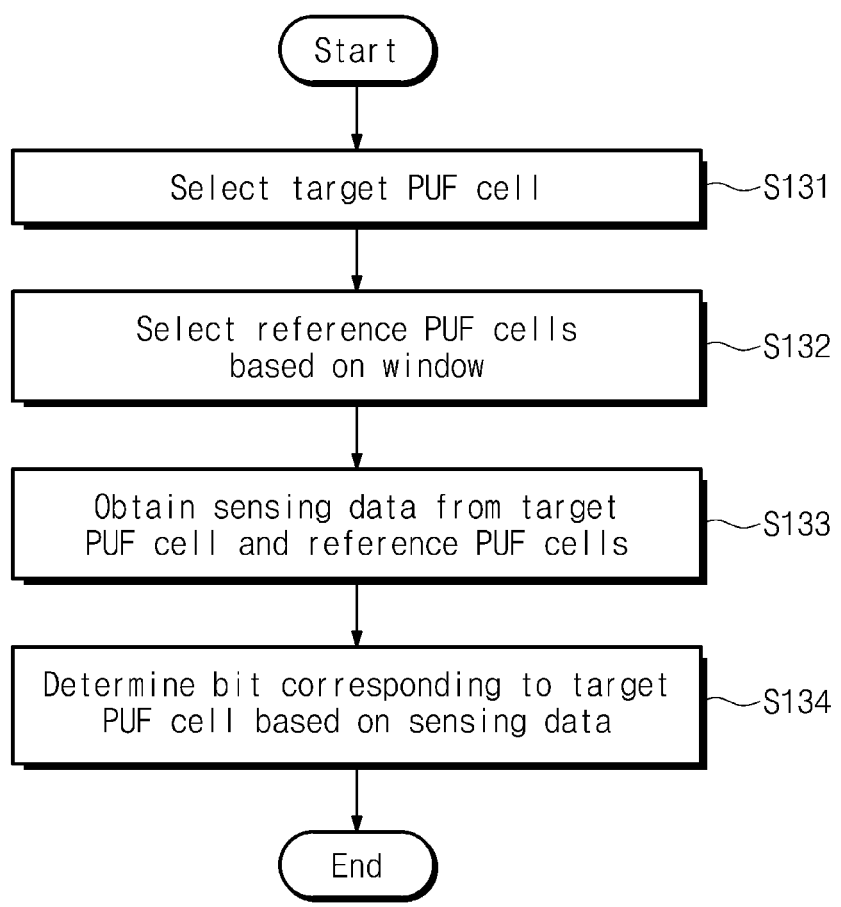
FIG. 6 is a flowchart illustrating an operation of a controller of FIG. 3.

FIG. 6 is a flowchart illustrating an operation of a controller of FIG. 3. In an example embodiment, a bit determination operation (i.e., operation S130 of FIG. 2) of the controller 120 of FIG. 3 will be described with reference to FIG. 6. Referring to FIGS. 3, 4, and 6, in operation S131, the controller 120 selects a target PUF cell. For example, the security device 100 may determine the target bits TB respectively associated with a plurality of PUF cells and may combine the determined target bits TB to generate the security key PUF_KEY. The controller 120 may select a target PUF cell, the target bit TB of which is to be determined, from among the plurality of PUF cells.

In operation S132, the controller 120 selects reference PUF cells based on a window. For example, the window controller 124 of the controller 120 may select reference PUF cells corresponding to the target PUF cell by applying a given window (or a variable window) to the sorted list LT_s. In detail, in the sorted list LT_s illustrated in FIG. 4, it is assumed that a target PUF cell is a PUF cell (i.e., PUF_012) of the second index ID002 and a window size is "3". In this case, the window controller 124 of the controller 120 may select PUF cells of the first and third indexes ID001 and ID003 (i.e., PUF_003 and PUF_127) logically adjacent to the second index ID002 as reference PUF cells. The above-described assumption is merely an example to assist in description of the technical idea of the inventive concepts, and the inventive concepts are not limited thereto.

In operation S133, the controller 120 reads sensing data from the target PUF cell and the reference PUF cells. For example, the PUF cell controller 125 of the controller 120 may generate the control signal CTRL for reading the sensing data from the target PUF cell and the reference PUF cells. The PUF cell array 110 may provide the controller 120 with the sensing data respectively corresponding to the target PUF cell and the reference PUF cells in response to the control signal CTRL from the PUF cell controller 125.

In operation S134, the controller 120 determines the target bit TB corresponding to the target PUF cell based on the sensing data obtained from the target PUF cell and the reference PUF cells. For example, the bit determiner 126 of the controller 120 may combine the sensing data obtained from the target PUF cell and the reference PUF cells to generate determination data and may determine the target bit TB corresponding to the target PUF cell based on the generated determination data. Alternatively, the bit determiner 126 of the controller 120 may generate a plurality of pre-bits based on the sensing data obtained from the target PUF cell and the reference PUF cells and may determine the target bit TB corresponding to the target PUF cell based on the plurality of pre-bits. However, the inventive concepts are not limited thereto. For example, the bit determiner 126 may determine the target bit TB corresponding to the target PUF cell through various operations.

Figure 7C:
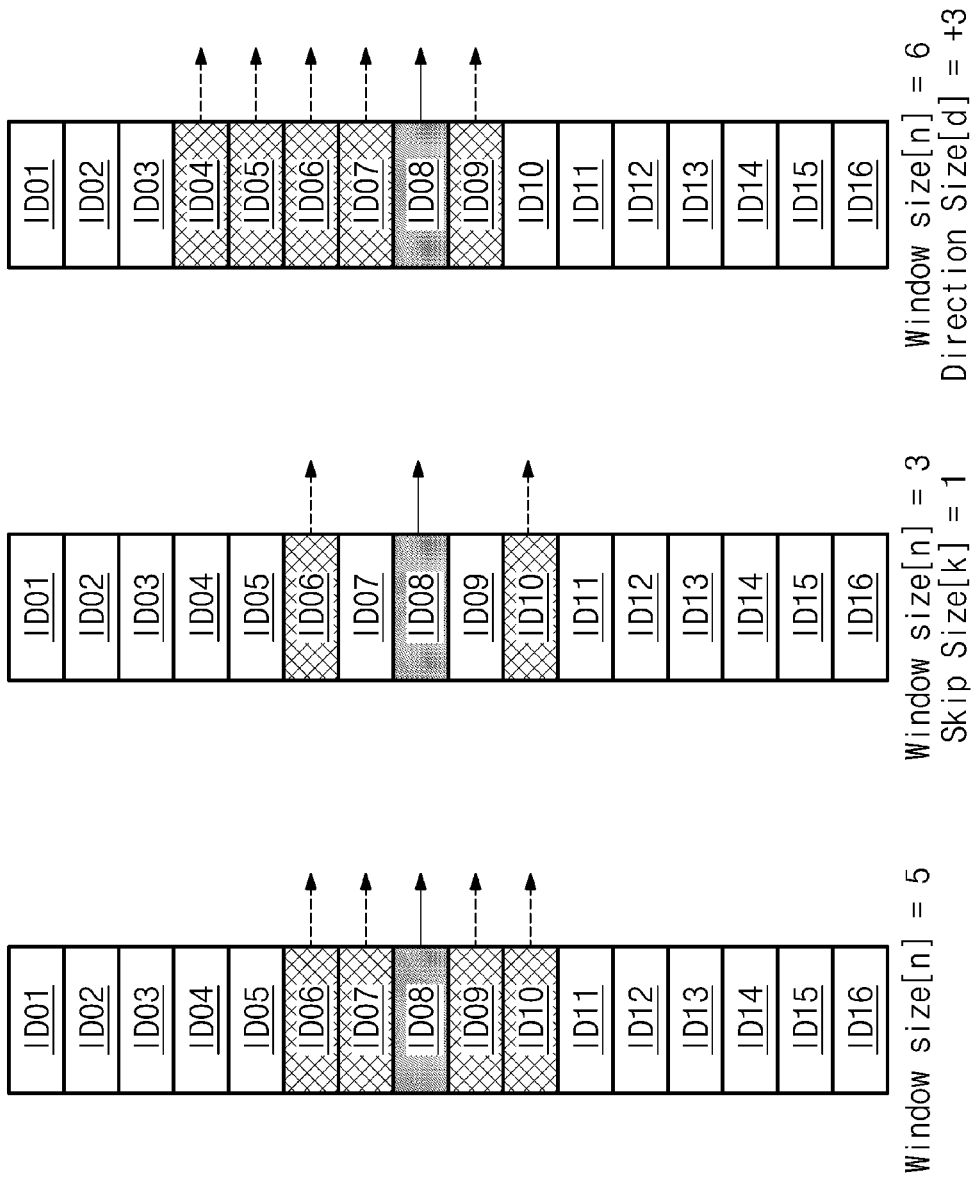

FIGS. 7A to 7C are diagrams descriptive of methods in which a window controller of FIG. 3 selects a reference PUF cell. Hereinafter, to assist in description of the technical idea of the inventive concepts, it is assumed that the PUF cell array 110 includes 16 PUF cells and the 16 PUF cells correspond to the first to sixteenth indexes ID01 to ID16, respectively. As described with reference to FIG. 4, the first to sixteenth indexes ID01 to ID16 may mean logical locations or orders of PUF cells in the sorted list LT_s that is generated by the sorting module 122 of the controller 120.

An embodiment in which a window size is "3" will be described with reference to FIGS. 3 and 7A. Referring to FIGS. 3 and 7A, a PUF cell corresponding to the first index ID01 may be selected as a target PUF cell. In this case, because the window size is "3", the window controller 124 may select PUF cells of the second and third indexes ID02 and ID03 logically adjacent to the first index ID01 as reference PUF cells in the sorted list LT_s. In other words, when the window size is "3", the total number of a target PUF cell and reference PUF cells is "3". In an embodiment, in the sorted list LT_s, PUF cells of logically adjacent indexes may not be adjacent to each other physically in the PUF cell array 110.

Afterwards, the controller 120 may read sensing data from a PUF cell corresponding to each of the first to third indexes ID01 to ID03 and may determine the target bit TB corresponding to the target PUF cell of the first index ID01 based on the read sensing data.

Then, a PUF cell of the second index ID02 may be selected as a target PUF cell. In this case, the window controller 124 of the controller 120 may select PUF cells of the first and third indexes ID01 and ID03 logically adjacent to the second index ID02 as reference PUF cells in the sorted list LT_s. Because an operation of determining the target bit TB corresponding to the target PUF cell (e.g., corresponding to the second index ID02) is similar to the above-described operation, additional description will be omitted to avoid redundancy.

Then, a PUF cell of the third index ID03 may be selected as a target PUF cell, and the window controller 124 of the controller 120 may select PUF cells of the second and fourth indexes ID02 and ID04 logically adjacent to the third index ID03 as reference PUF cells in the sorted list LT_s. Because an operation of determining the target bit TB corresponding to the target PUF cell (e.g., corresponding to the third index ID03) is similar to the above-described operation, additional description will be omitted to avoid redundancy. With regard to the fourth to sixteenth indexes ID04 to ID16, the controller 120 may perform target PUF cell selecting operations, reference PUF cell selecting operations, and target bit determining operations as in the above manner.

As described above, because two or more reference PUF cells are used together to determine the target bit TB corresponding to one target PUF cell, an error of the target bit TB corresponding to the target PUF cell may decrease. Also, because each of a plurality of PUF cells is able to be selected as a target PUF cell, the security key PUF_KEY may be generated based on the target bits TB associated with all the PUF cells. In other embodiments, it is possible to use only a part of the PUF cells selectively to generate the security key PUF_KEY.

Hereinafter, an embodiment in which a window size is "3" will be described with reference to FIGS. 3 and 7B. A way to select reference PUF cells in the embodiment of FIG. 7B is similar to the way described in the embodiment of FIG. 7A. However, the embodiments of FIGS. 7A and 7B may be different in terms of a way to select reference PUF cells with regard to particular PUF cells (e.g., PUF cells of the indexes ID01 and ID16 located at opposite edges of the sorted list LT_s).

For example, in the embodiment of FIG. 7A, in the case where a PUF cell of the first index ID01 is a target PUF cell, PUF cells of the second and third indexes ID02 and ID03 are selected as reference PUF cells. However, in the embodiment of FIG. 7B, in the case where the PUF cell of the first index ID01 is selected as a target PUF cell, even though a window size is "3", a PUF cell of only the second index ID02 is selected as a reference PUF cell.

That is, under the above condition, even though a window size is "3", only one reference PUF cell may be selected to determine the target bit TB corresponding to the PUF cell of the first index ID01 as the target PUF cell. In this case, the controller 120 may use first virtual data VT1 determined in advance, as sensing data associated with the other PUF cell. As a result, the bit determiner 126 may determine the target bit TB corresponding to the target PUF cell of the first index ID01 based on the first virtual data VT1, the sensing data corresponding to the target PUF cell of the first index ID01, and the sensing data corresponding to the reference PUF cell of the second index ID02.

Likewise, in the case where a PUF cell of the sixteenth index ID16 is selected as a target PUF cell, the controller 120 may select a PUF cell of the fifteenth index ID15 as a reference PUF cell. The bit determiner 126 may determine the target bit TB corresponding to the target PUF cell of the sixteenth index ID16 based on second virtual data VT2 determined in advance, the sensing data corresponding to the target PUF cell of the sixteenth index ID16, and the sensing data corresponding to the reference PUF cell of the fifteenth index ID15.

Embodiments associated with various types of windows will be described with reference to FIGS. 3 and 7C. Referring to FIGS. 3 and 7C, the window controller 124 of the controller 120 may adjust various variables "n", "k", and "d" for setting a window.

In an example embodiment, a window size "n" may be variable. For example, in the case where the window size "n" is "5" as illustrated in FIG. 7C, four reference PUF cells logically adjacent to a target PUF cell may be selected in the sorted list LT_s. Although not illustrated in drawings, the window size "n" may be variously changed, and the number of reference PUF cells that are used to determine the target bit TB corresponding to one target PUF cell may be determined depending on the window size "n".

In an example embodiment, a skip size "k" of a window may be variable. For example, as illustrated in FIG. 7C, when the window size "n" is "3" and the skip size "k" is "1", PUF cells of the sixth and tenth indexes ID06 and ID10 may be selected as reference PUF cells corresponding to a target PUF cell of the eighth index ID08. That is, as the window skip size "k" is changed, logical locations (i.e., locations of the sorted list LT_s) of reference PUF cells corresponding to a target PUF cell may be determined.

In an example embodiment, a direction size "d" of a window may be variable. For example, as illustrated in FIG. 7C, when the window size "n" is "6" and the window direction size "d" is "+3", PUF cells of the fourth, fifth, sixth, and seventh indexes ID04, ID05, ID06, and ID07 above the eighth index ID08, and the ninth index ID09 below the eighth index ID08, may be selected as reference PUF cells corresponding to a target PUF cell of the eighth index ID08. That is, logical locations of reference PUF cells corresponding to a target PUF cell (i.e., locations of the sorted list LT_s or a logical direction from a target PUF cell on the sorted list LT_s) may be determined depending on the window direction size "d".

In an example embodiment, a height of an index (i.e., that a reference PUF cell is above or below an index of a target PUF cell) may indicate a logical direction on the sorted list LT_s. In an example embodiment, the window direction size "d" may indicate a value that is obtained by subtracting the number of reference PUF cells having indexes below an index of a target PUF cell from the number of reference PUF cells having indexes above the index of the target PUF cell. However, the inventive concepts are not limited thereto.

As described above, the security device 100 according to an embodiment of the inventive concepts may select target PUF cells from a plurality of PUF cells, may determine the target bits TB respectively corresponding to the target PUF cells, and may generate the security key PUF_KEY by using the determined target bits TB. In this case, the security device 100 may select reference PUF cells associated with a target PUF cell by applying a window to the sorted list LT_s and may determine the target bit TB corresponding to the target PUF cell by using the selected reference PUF cells and the target PUF cell. Accordingly, an error of an operation of determining the target bit TB corresponding to a target PUF cell may decrease. Also, because all the PUF cells are able to be used as target PUF cells (or a part of the PUF cells is selectively usable), a security key may be identically generated by using less PUF cells compared to a conventional manner. Accordingly, a security device having improved performance and reduced costs is provided.

Figure 8:
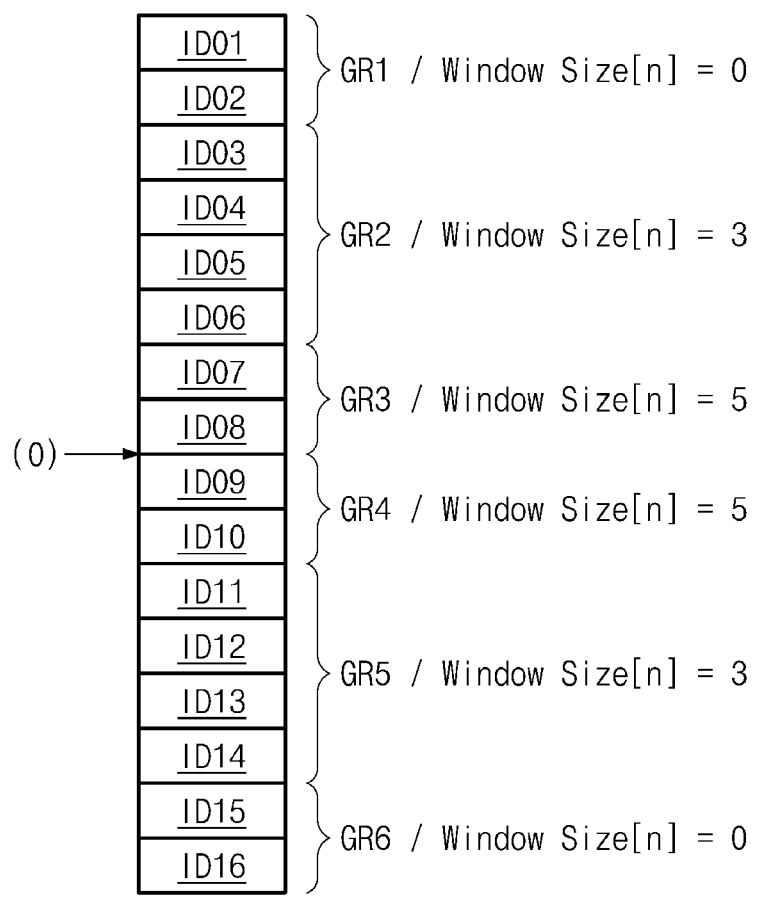
FIG. 8 is a diagram descriptive of a method in which a window controller of FIG. 2 selects a reference PUF cell.

FIG. 8 is a diagram descriptive of a method in which a window controller of FIG. 3 selects a reference PUF cell. In an example embodiment, a fixed window may be used as described with reference to FIGS. 7A to 7C. The fixed window may be preset. In contrast, in an embodiment as described hereinafter with reference to FIG. 8, a variable window may be used depending on a logical location of a target PUF cell.

Referring to FIGS. 3 and 8, the controller 120 may generate the sorted list LT_s. The sorted list LT_s may include the first to sixteenth indexes ID01 to ID16. In an example embodiment, the first to sixteenth indexes ID01 to ID16 may respectively correspond to a plurality of PUF cells as described above, and thus, additional description will be omitted to avoid redundancy.

Referring to the distribution illustrated in FIG. 5, the PUF cell of the first index ID01 may for example be located in a right region (e.g., a region where the PUF cell PUF_003 is located) of the distribution, and the PUF cell of the sixteenth index ID16 may for example be located in a left region (e.g., a region where the PUF cell PUF_092 is located) of the distribution. In an example embodiment, the reliability of PUF cells located in the left region or the right region of the distribution of FIG. 5 may be relatively high. In other words, even though sensing data associated with the PUF cells in the left region or the right region of the distribution of FIG. 5 may be changed due to various ambient factors, the target bit TB that is finally determined may be maintained relatively uniformly.

In contrast, the PUF cells of the seventh, eighth, ninth, or tenth indexes ID07, ID08, ID09, or ID10 may be located in the vicinity of a reference value "0". When sensing data associated with PUF cells located in the vicinity of the reference value "0" are changed due to various ambient factors, the finally determined target bit TB may be changed. That is, the reliability of PUF cells located in the vicinity of the reference value "0" may be relatively low.

In the embodiment of FIG. 8, the window controller 124 of the controller 120 may divide the sorted list LT_s into a plurality of groups GR1 to GR6 and may differently set a window to be applied to each of the plurality of groups GR1 to GR6. In other words, the window controller 124 may select reference PUF cells by using a window that is variable depending on a target PUF cell.

For example, as illustrated in FIG. 8, the first and second indexes ID01 and ID02 may be classified as the first group GR1, the third to sixth indexes ID03 to ID06 may be classified as the second group GR2, the seventh and eighth indexes ID07 and ID08 may be classified as the third group GR3, the ninth and tenth indexes ID09 and ID10 may be classified as the fourth group GR4, the eleventh to fourteenth indexes ID11 to ID14 may be classified as the fifth group GR5, and the fifteenth and sixteenth indexes ID15 and ID16 may be classified as the sixth group GR6.

The window controller 124 may set the window size "n" of the first and sixth groups GR1 and GR6 to "0", may set the window size "n" of the third and fourth groups GR3 and GR4 to "5", and may set the window size "n" of the second and fifth groups GR2 and GR5 to "3". A numerical value of the window size "n" associated with each group is exemplary, and the inventive concepts are not limited thereto.

In an example embodiment, the first and sixth groups GR1 and GR6 may be a set of PUF cells having a relatively high reliability. The third and fourth groups GR3 and GR4 may be a set of PUF cells having a relatively low reliability. The second and fifth groups GR2 and GR5 may be a set of PUF cells, the reliability of which is relatively lower than the reliability of the first and sixth groups GR1 and GR6 and relatively higher than the reliability of the third and fourth groups GR3 and GR4. In an example embodiment, when a target PUF cell having a low reliability is selected, the reliability of the finally determined target bit TB may be improved by increasing the window size "n".

For example, the PUF cell of the first index ID01 may have a relatively high reliability. In other words, when the PUF cell of the first index ID01 is a target PUF cell, the reliability of the target bit TB that is determined based on sensing data associated with the target PUF cell may be relatively high. Accordingly, when the PUF cell of the first index ID01 included in the first group GR1 is a target PUF cell, even though the window size "n" is set to "0", the target bit TB corresponding to the target PUF cell may have a high reliability.

For example, the PUF cell of the eighth index ID08 may have a relatively low reliability. In other words, when the PUF cell of the eighth index ID08 is selected as a target PUF cell, the reliability of the target bit TB that is determined based on sensing data associated with the target PUF cell may be relatively low. In this case, the reliability of the determined target bit TB may be improved by increasing the window size "n" (i.e., to "5"). That is, when a PUF cell having a low reliability is selected as a target PUF cell, the number of reference PUF cells may increase by increasing the window size "n", and thus, an error of the target bit TB corresponding to the target PUF cell may decrease.

Figure 9:
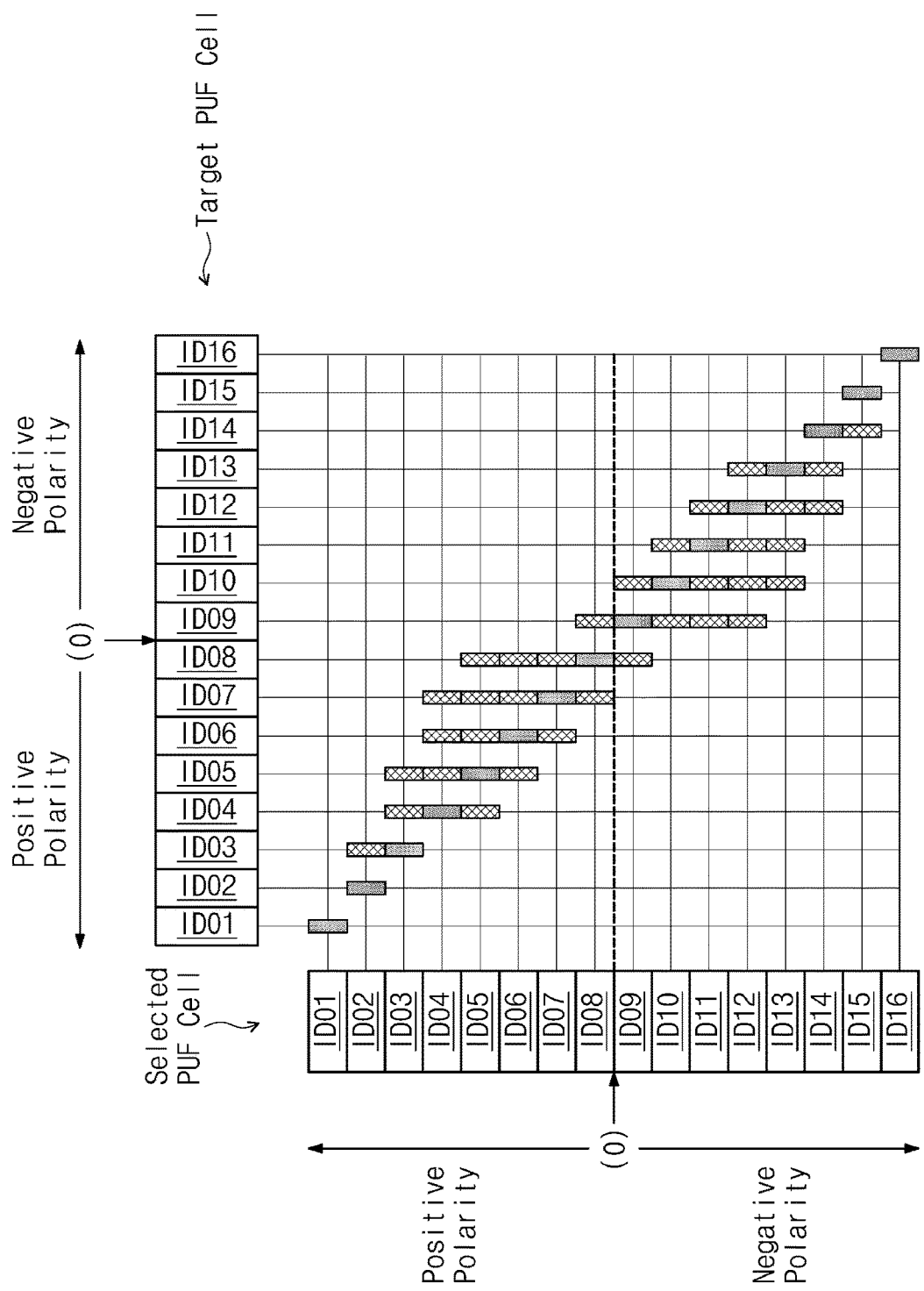
FIG. 9 is a diagram descriptive of a method in which a window controller of FIG. 2 selects a reference PUF cell.

FIG. 9 is a diagram for describing a method in which a window controller of FIG. 3 selects a reference PUF cell. In the embodiment described with reference to FIG. 8, the window controller 124 may select reference PUF cells by dividing the sorted list LT_s into a plurality of groups and applying a variable window to each of the divided groups. However, the inventive concepts are not limited thereto.

For example, referring to FIGS. 3 and 9, the window controller 124 may select reference PUF cells corresponding to a target PUF cell by using a different (or variable) window with regard to each target PUF cell. In detail, as illustrated in FIG. 9, when the PUF cell of the first index ID01, the second index ID02, the fifteenth index ID15, or the sixteenth index ID16 is selected as a target PUF cell, the window controller 124 may set the window size "n" to "0". That is, when the PUF cell of the first index ID01, the second index ID02, the fifteenth index ID15, or the sixteenth index ID16 is selected as a target PUF cell, the target bit TB may be determined based on sensing data corresponding to the target PUF cell without selecting separate reference PUF cells.

In contrast, when the PUF cell of the third index ID03 is selected as a target PUF cell, the window controller 124 may set the window size "n" to "2" and may set the window direction size "d" to "+1". In this case, the PUF cell of the second index ID02 may be selected as a reference PUF cell. As in the above description, when the PUF cell of the fourteenth index ID14 is selected as a target PUF cell, the window controller 124 may set the window size "n" to "2" and may set the window direction size "d" to "−1". In this case, the PUF cell of the fifteenth index ID15 may be selected as a reference PUF cell.

Likewise, the window controller 124 may variously change factors of a window depending on an index corresponding to a target PUF cell. According to the embodiment illustrated in FIG. 9, the window controller 124 may set the window size "n" to "3" and the window direction size "d" to "0" with regard to the fourth index ID04, may set the window size "n" to "4" and the window direction size "d" to "+1" with regard to the fifth and sixth indexes ID05 and ID06, may set the window size "n" to "5" and the window direction size "d" to "+2" with regard to the seventh and eighth indexes ID07 and ID08, may set the window size "n" to "5" and the window direction size "d" to "−2" with regard to the ninth and tenth indexes ID09 and ID10, may set the window size "n" to "4" and the window direction size "d" to "−1" with regard to the eleventh and twelfth indexes ID11 and ID12, and may set the window size "n" to "3" and the window direction size "d" to "0" with regard to the thirteenth index ID13.

In an example embodiment, the window direction size "d" may be determined to correspond to a polarity of a target PUF cell. For example, the PUF cells of the first to eighth indexes ID01 to ID08 may have a positive polarity. In this case, with regard to each of the first to eighth indexes ID01 to ID08, the window direction size "d" may be set to be greater than or equal to "0". Alternatively, the PUF cells of the ninth to sixteenth indexes ID09 to ID16 may have a negative polarity. In this case, with regard to each of the ninth to sixteenth indexes ID09 to ID16, the window direction size "d" may be set to be smaller than or equal to "0". However, the inventive concepts are not limited thereto.

As described above, the security device 100 according to an embodiment of the inventive concepts may select reference PUF cells associated with a target PUF cell by using a window or a variable window and may determine the target bit TB corresponding to the target PUF cell based on sensing data obtained from the target PUF cell and the reference PUF cells. Accordingly, the reliability of the security device 100 may be improved. It should be well understood that the above embodiments or the numerical values and terms mentioned in the embodiments are used to assist in description of the technical idea of the inventive concepts and the inventive concepts are not limited thereto.

Figure 10A:
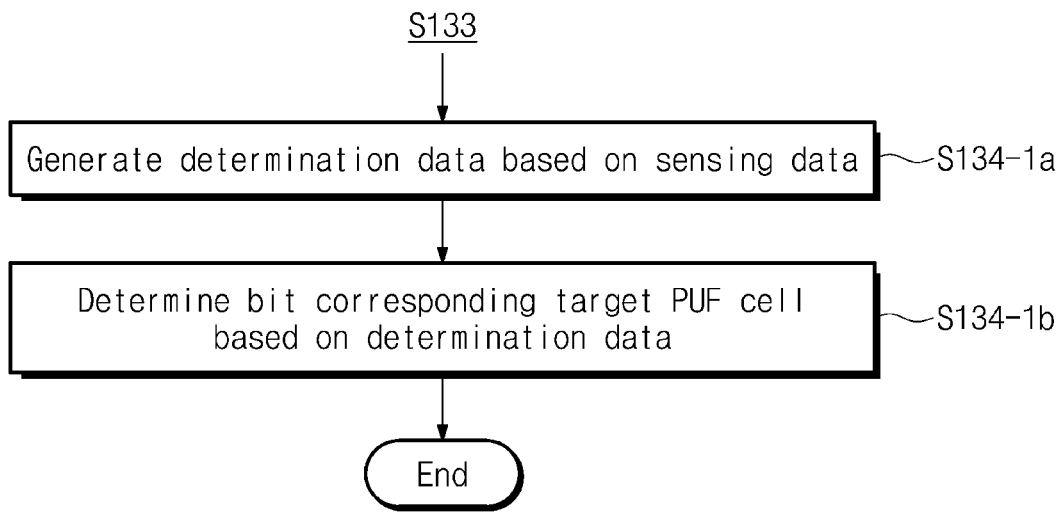
FIG. 10A is a flowchart descriptive of operation S134 of FIG. 6 (i.e., an operation of determining a target bit).
Figure 10B:
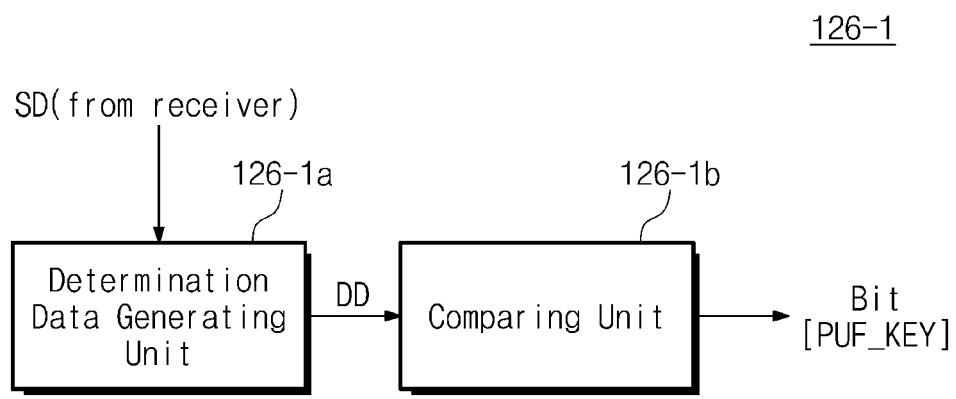
FIG. 10B is a block diagram descriptive of operation S134 of FIG. 6 (i.e., an operation of determining a target bit).

FIG. 10A is a flowchart descriptive of operation S134 of FIG. 6 (i.e., an operation of determining the target bit TB), and FIG. 10B is a block diagram descriptive of operation S134 of FIG. 6 (i.e., an operation of determining the target bit TB). Referring to FIGS. 2, 6, 10A, and 10B, the controller 120 may perform operation S134 after operation S133. Operation S134 may include operation S134-1a and operation S134-1b.

In operation S134-1a, the controller 120 may generate determination data DD based on sensing data SD. In operation S134-1b, the controller 120 may determine the target bit TB corresponding to a target PUF cell based on the determination data DD.

For example, as described above, the controller 120 may apply a window or a variable window to the sorted list LT_s to select reference PUF cells corresponding to the target PUF cell. The controller 120 may obtain sensing data from the target PUF cell and the reference PUF cells. In an example embodiment, the sensing data from the target PUF cell and the reference PUF cells may be converted to a digital value by the receiver 121, and the converted digital value may be provided to the bit determiner 126.

As illustrated in FIG. 10B, the bit determiner 126-1 may include a determination data generating unit (or circuit) 126-1a and a comparing unit (or circuit) 126-1b. The determination data generating unit 126-1a may receive the sensing data SD from the receiver 121. The determination data generating unit 126-1a may generate the determination data DD based on the sensing data SD.

For example, it is assumed that the window size "n" is "3" and sensing data obtained from the target PUF cell and the reference PUF cells are [x0, x1, x2]. In this case, the determination data generating unit 126-1a may generate determination data DD1 and DD2 based on Equation 1 below.

$$|x_0| \geq |x_1| \geq |x_2|$$

$$DD1 = 2x_0$$

$$DD2 = x_1 + x_2 \qquad \text{[Equation 1]}$$

The comparing unit 126-1b may determine the target bit TB corresponding to the target PUF cell by comparing the sizes of the determination data DD1 and DD2 generated by the determination data generating unit 126-1a. For example, when the first determination data DD1 is greater than the second determination data DD2, the comparing unit 126-1b may determine the target bit TB of the target PUF cell as bit "1"; when the first determination data DD1 is smaller than the second determination data DD2, the comparing unit 126-1b may determine the target bit TB of the target PUF cell as bit "0".

In detail, it is assumed for example that sensing data obtained from the target PUF cell and the reference PUF cells are [8, 6, 7]. In this case, according to Equation 1, x0 may be "8", x1 may be "7", x2 may be "6", the first determination data DD1 may be "16", and the second determination data DD2 may be "13". In this case, because the first determination data DD1 (i.e., 16) is greater than the second determination data DD2 (i.e., 13), the comparing unit 126-1b may determine the target bit TB of the target PUF cell as bit "1".

As another example, it is assumed that sensing data obtained from the target PUF cell and the reference PUF cells are [−3, −5, −1]. In this case, according to Equation 1, x0 may be "−5", x1 may be "−3", x2 may be "4", the first determination data DD1 may be "−10", and the second determination data DD2 may be "−4". In this case, because the first determination data DD1 (i.e., −10) is smaller than the second determination data DD2 (i.e., −4), the comparing unit 126-1b may determine the target bit TB of the target PUF cell as bit "0".

As still another example, it is assumed that sensing data obtained from the target PUF cell and the reference PUF cells are [3, 2, −1]. In this case, according to Equation 1, x0 may be "3", x1 may be "2", x2 may be "4", the first determination data DD1 may be "6", and the second determination data DD2 may be "1". In this case, because the first determination data DD1 is greater than the second determination data DD2, the comparing unit 126-1b may determine the target bit TB of the target PUF cell as bit "1".

In an example embodiment, sensing data that are read from a particular PUF cell may vary depending on various ambient factors such as temperature and voltage. For example, in the example where the sensing data of the target PUF cell and the reference PUF cells are [3, 2, −1], actually obtained sensing data may be changed to [−0.5, 2, −1] due to various ambient factors. In this case, according to Equation 1, x0 may be "2", x1 may be "4", x2 may be "−0.5", the first determination data DD1 may be "4", and the second determination data DD2 may be "−1.5". In this case, because the first determination data DD1 is greater than the second determination data DD2, the comparing unit 126-1b may determine the target bit TB of the target PUF cell as bit "1".

In other words, when a PUF cell, the sensing data of which is changed from "3" to "−0.5" due to an ambient factor, according to a conventional way, because sensing data are "−0.5", the target bit TB corresponding to the target PUF cell may be determined as bit "0". That is, a bit error may occur. However, according to an embodiment of the inventive concepts, even though a value or a polarity of sensing data of a target PUF cell is changed, an intended target bit TB (in the present embodiment, bit "1") may be maintained. That is, the reliability of the target bit TB or the security key PUF_KEY being a combination of the target bits TB may be improved by selecting reference PUF cells by using a window or a variable window and using sensing data of the reference PUF cells in an operation of determining the target bit TB.

The above operation of determining the target bit TB is an example for assisting in description of embodiments of the inventive concepts, and the inventive concepts are not limited thereto. For example, the determination data generating unit 126-1a may be configured to generate determination data by performing various operations (e.g., an average value calculating operation and an intermediate value calculating operation) on sensing data obtained from the target PUF cell and the reference PUF cells. The comparing unit 126-1b may determine the target bit TB corresponding to the target PUF cell by comparing the generated determination data with a given reference value.

Figure 11A:
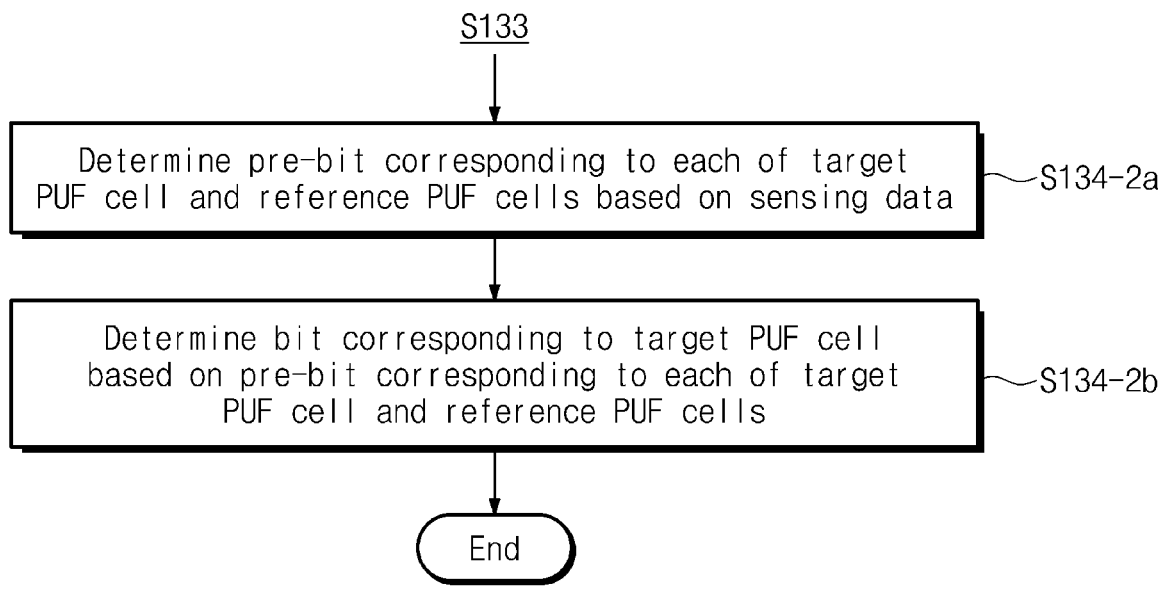
FIG. 11A is a flowchart descriptive of operation S134 of FIG. 6 (i.e., an operation of determining a target bit).
Figure 11B:
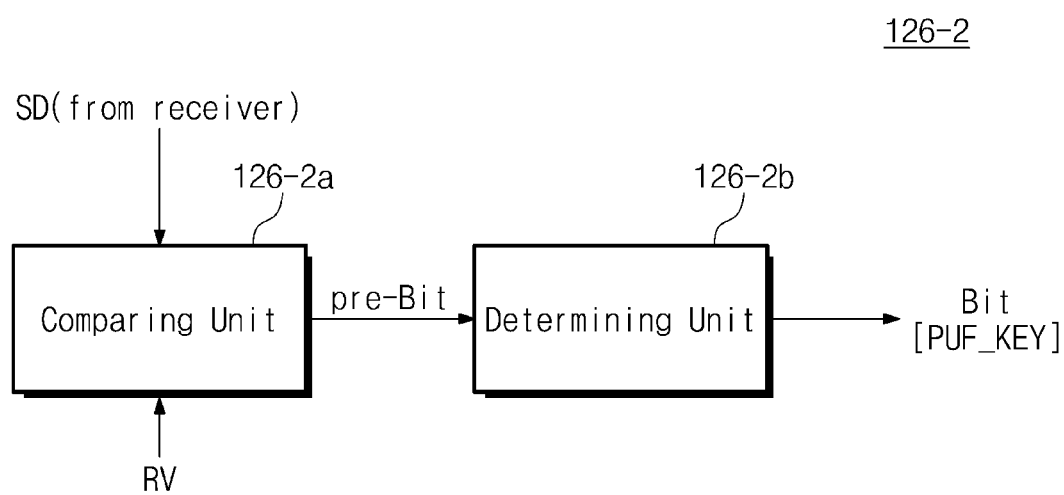
FIG. 11B is a block diagram descriptive of operation S134 of FIG. 6 (i.e., an operation of determining a target bit).

FIG. 11A is a flowchart descriptive of operation S134 of FIG. 6 (i.e., an operation of determining the target bit TB), and FIG. 11B is a block diagram descriptive of operation S134 of FIG. 6 (i.e., an operation of determining the target bit TB). Referring to FIGS. 2, 6, 11A, and 11B, the controller 120 may perform operation S134 after operation S133. Operation S134 may include operation S134-2a and operation S134-2b.

In operation S134-2a, the controller 120 may generate pre-bits PB respectively corresponding to a target PUF cell and reference PUF cells based on sensing data. In operation S134-2b, the controller 120 may determine the target bit TB corresponding to the target PUF cell based on the pre-bits PB.

For example, a bit determiner 126-2 of the controller 120 may include a comparing unit (or circuit) 126-2a and a determining unit (or circuit) 126-2b. The comparing unit 126-2a may generate the pre-bits PB respectively corresponding to the target PUF cell and the reference PUF cells based on sensing data obtained from the target PUF cell and the reference PUF cells. The comparing unit 126-2a may generate the pre-bits PB by comparing the sensing data obtained from each of the target PUF cell and the reference PUF cells with a reference value RV.

In detail, for example it is assumed that the window size "n" is "5", sensing data obtained from the target PUF cell and the reference PUF cells are [4, 3, 2, 1, −1], and the reference value RV is "0". The comparing unit 126-2a may compare each of the sensing data [4, 3, 2, 1, −1] with the reference value RV and may generate the pre-bits PB being a combination of bit "1" and bit "0" depending on a comparison result. In this case, because the sensing data "4", "3", "2", and "1" are greater than "0" being the reference value RV, a pre-bit corresponding to each of the sensing data [4, 3, 2, 1] may be determined as bit "1". Also, because "−1" is smaller than "0" being the reference value RV, a pre-bit corresponding to the sensing data [−1] may be determined as bit "0". That is, in the case where the sensing data are [4, 3, 2, 1, −1], the pre-bits PB may be determined as "11110".

The determining unit 126-2b may determine the target bit TB corresponding to the target PUF cell based on the pre-bits PB. For example, the determining unit 126-2b may compare the number of 1's in the pre-bits PB and the number of 0's in the pre-bits PB. When the number of 1's is more than the number of 0's, the determining unit 126-2b may determine the target bit TB corresponding to the target PUF cell as bit "1". When the number of 0's is more than the number of 1's, the determining unit 126-2b may determine the target bit TB corresponding to the target PUF cell as bit "0". In the case where the pre-bits PB are "11110", because the number of 1's is more than the number of 0's, the determining unit 126-2b may determine the target bit TB corresponding to the target PUF cell as bit "1".

According to the above-described embodiment, even though sensing data obtained from a particular PUF cell may be changed due to an ambient factor or a polarity may be changed, the reliability of the finally determined target bit TB may be maintained. In the above example where the sensing data are [4, 3, 2, 1, −1], sensing data of a particular PUF cell (in particular, a target PUF cell) may be changed due to an ambient factor, and thus, sensing data of [−1, 3, 2, 1, −1] may instead be obtained. In this case, as in the above description, the pre-bits PB may be determined as "01110". Because the number of 1's is more than the number of 0's, the determining unit 126-2b may determine the target bit TB corresponding to the target PUF cell as bit "1". This result is the same as the result obtained in the above example where the sensing data are [4, 3, 2, 1, −1]. That is, even though a value or a polarity of sensing data of a particular PUF cell is changed due to an ambient factor, the security device 100 according to an embodiment of the inventive concepts may maintain the reliability of a security key.

Figure 12:
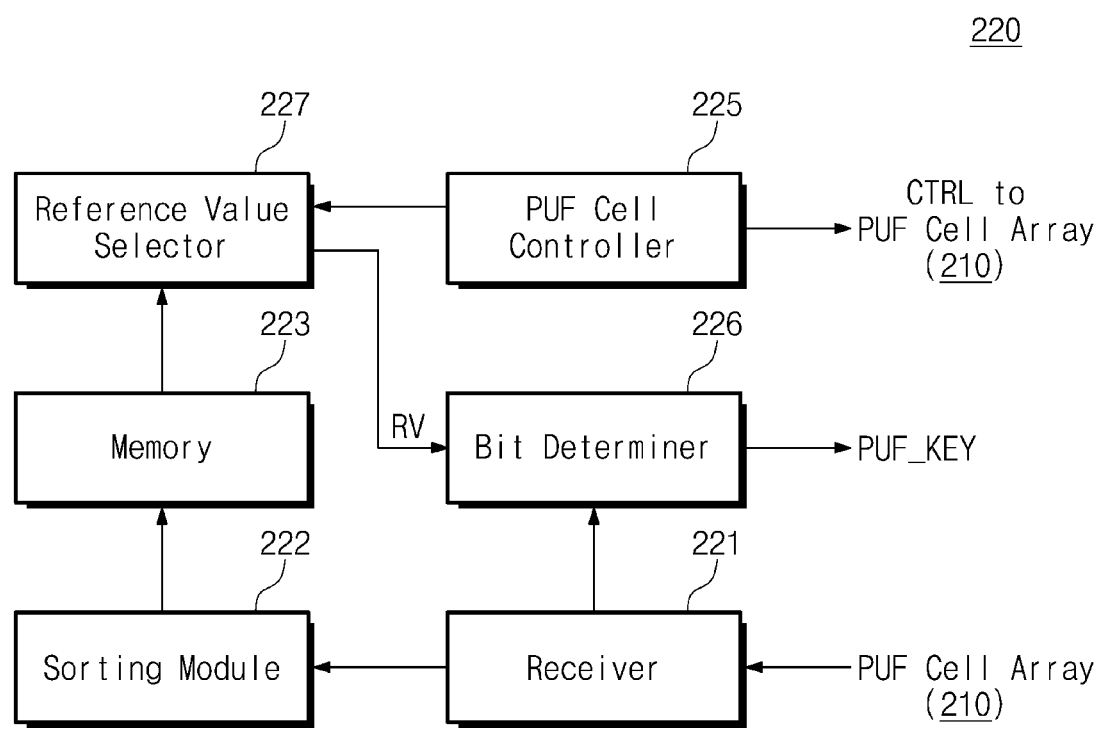
FIG. 12 is a block diagram illustrating a controller of a security device according to an embodiment of the inventive concepts.
Figure 13:
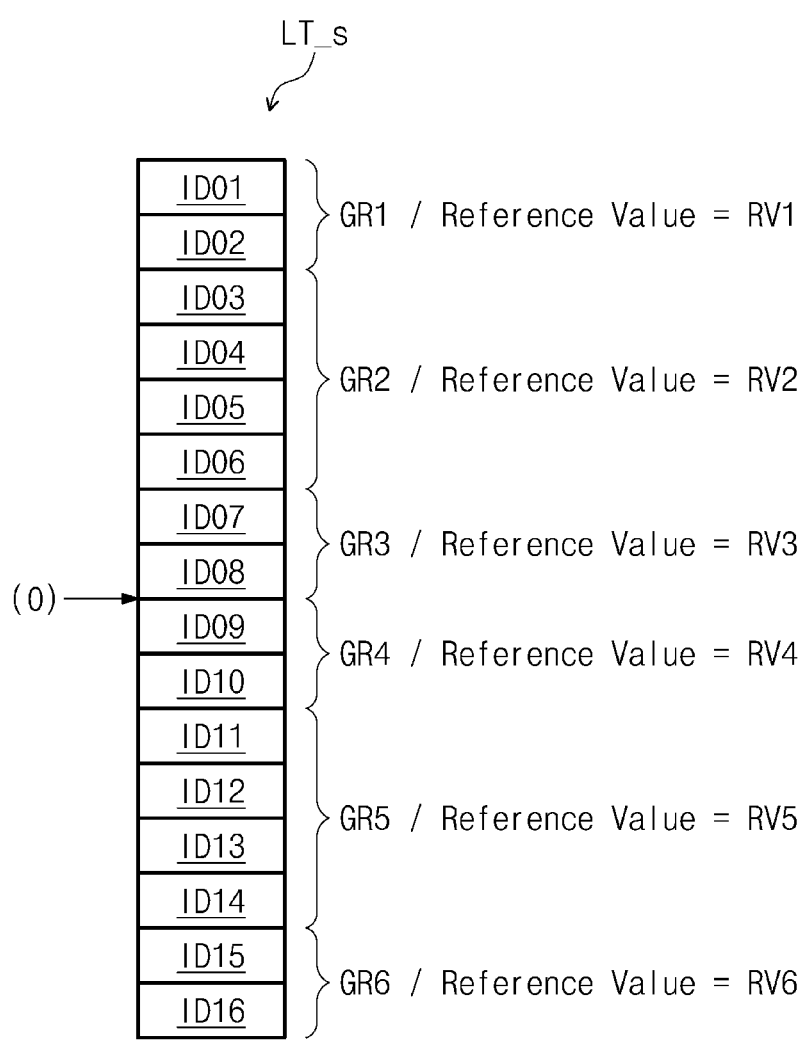
FIG. 13 is a diagram descriptive of an operation of a controller of FIG. 12.

FIG. 12 is a block diagram illustrating a controller of a security device according to an embodiment of the inventive concepts. FIG. 13 is a diagram descriptive of an operation of a controller of FIG. 12. Referring to FIGS. 12 and 13, a controller 220 may include a receiver 221, a sorting module 222, a memory 223, a PUF cell controller 225, a bit determiner 226, and a reference value selector 227. In an example embodiment, the memory 223 may store the sorted list LT_s described above.

The receiver 221, the sorting module 222, the memory 223, the sorted list LT_s stored in memory 223, and the PUF cell controller 225 are respectively similar to receiver 121, the sorting module 122, the memory 123, the sorted list LT_s stored in memory 123, and the PUF cell controller 125 described with reference to FIGS. 1 to 11, and thus, additional description will be omitted to avoid redundancy.

The reference value selector 227 may select the reference value RV corresponding to a target PUF cell from among a plurality of reference values with reference to the sorted list LT_s stored in the memory 223. The bit determiner 226 may determine the target bit TB corresponding to the target PUF cell by comparing the reference value RV selected by the reference value selector 227 and sensing data read from the target PUF cell.

For example, a conventional PUF cell-based security device generates a security key by comparing sensing data from all PUF cells with a fixed reference value. In this case, an error may occur in PUF cells, in each of which a difference between sensing data and the fixed reference value is relatively small. The controller 220 of the security device 100 according to an embodiment of the inventive concepts may determine the target bit TB corresponding to each of "m" PUF cells by using "n" reference values (n and m being a positive integer and n being smaller than m).

In detail, as illustrated in FIG. 13, the reference value selector 227 may divide the plurality of indexes ID01 to ID16 included in the sorted list LT_s into the plurality of groups GR1 to GR6. The first and second indexes ID01 and ID02 may be included in the first group GR1, the third to sixth indexes ID03 to ID06 may be included in the second group GR2, the seventh and eighth indexes ID07 and ID08 may be included in the third group GR3, the ninth and tenth indexes ID09 and ID10 may be included in the fourth group GR4, the eleventh to fourteenth indexes ID11 to ID14 may be included in the fifth group GR5, and the fifteenth and sixteenth indexes ID15 and ID16 may be included in the sixth group GR6.

When one of PUF cells of the first and second indexes ID01 and ID02 included in the first group GR1 is selected as a target PUF cell, the reference value selector 227 may select a first reference value RV1 of the plurality of reference values. In this case, the bit determiner 226 may determine the target bit TB corresponding to the target PUF cell by comparing sensing data read from the target PUF cell (i.e., one of the PUF cells of the first and second indexes ID01 and ID02) with the first reference value RV1.

When one of PUF cells of the third to sixth indexes ID03 to ID06 included in the second group GR2 is selected as a target PUF cell, the reference value selector 227 may select a second reference value RV2 of the plurality of reference values. In this case, the bit determiner 226 may determine the target bit TB corresponding to the target PUF cell by comparing sensing data read from the target PUF cell (i.e., one of the PUF cells of the third to sixth indexes ID03 to ID06) with the second reference value RV2.

Likewise, when one of PUF cells of the seventh and eighth indexes ID07 and ID08 included in the third group GR3 is selected as a target PUF cell, the reference value selector 227 may select a third reference value RV3; when one of PUF cells of the ninth and tenth indexes ID09 and ID10 included in the fourth group GR4 is selected as a target PUF cell, the reference value selector 227 may select a fourth reference value RV4; when one of PUF cells of the eleventh to fourteenth indexes ID11 to ID14 included in the fifth group GR5 is selected as a target PUF cell, the reference value selector 227 may select a fifth reference value RV5; and, when one of PUF cells of the fifteenth and sixteenth indexes ID15 and ID16 included in the sixth group GR6 is selected as a target PUF cell, the reference value selector 227 may select a sixth reference value RV6.

As described above, the security device according to an embodiment of the inventive concept may determine the target bit TB corresponding to a plurality of PUF cells by using a plurality of reference values. As such, the reliability of the security key generated from the security device may be improved.

Figure 14A:
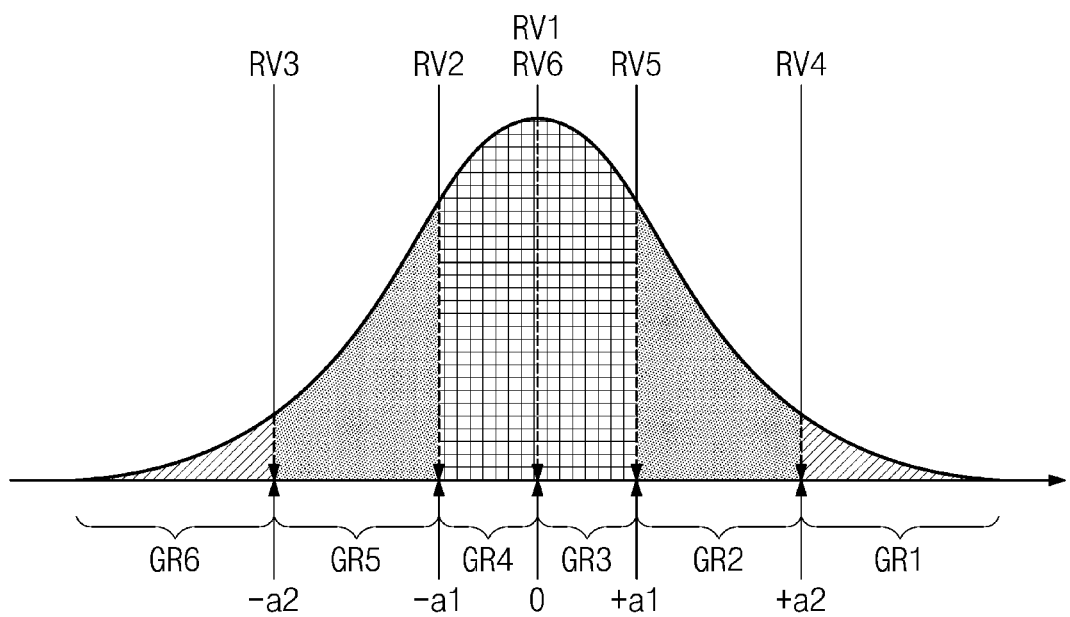
FIGS. 14A and 14B are distribution diagrams descriptive of a plurality of reference values selected by a reference value selector of a controller of FIG. 12.
Figure 14B:
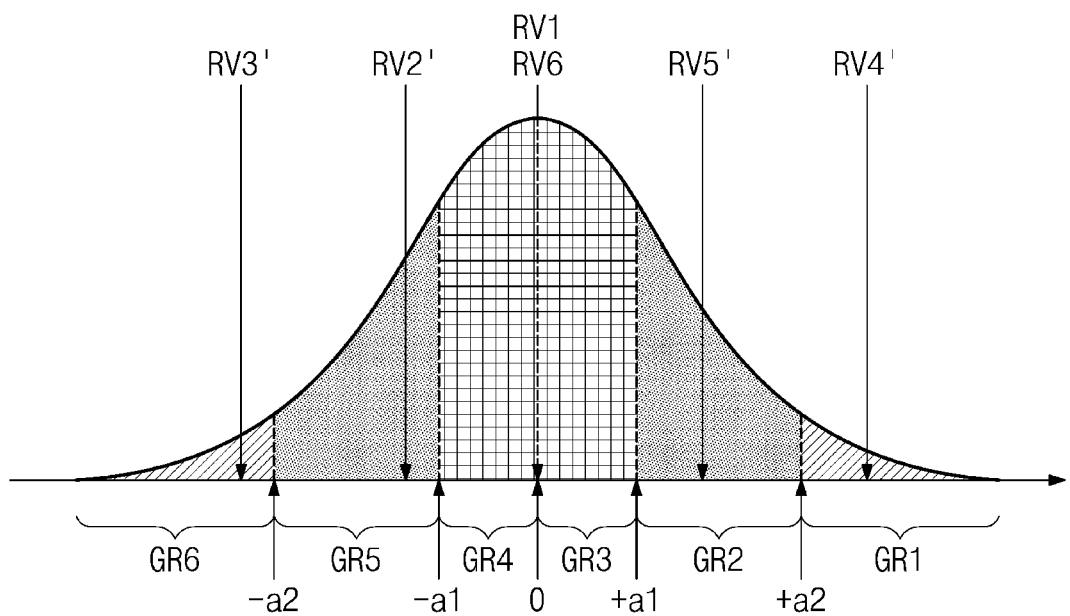

FIGS. 14A and 14B are distribution diagrams descriptive of a plurality of reference values selected by a reference value selector of a controller of FIG. 12. In FIGS. 14A and 14B, a horizontal axis represents the size of raw data, and a vertical axis represents the number of PUF cells.

Referring to FIGS. 14A and 14B, the reference value selector 227 of the controller 220 may divide a plurality of PUF cells into the plurality of groups GR1 to GR6 based on division values −a2, −a1, 0, +a1, and +a2. For example, the reference value selector 227 may classify PUF cells having raw data greater than "+a2" as the first group GR1. The reference value selector 227 may classify PUF cells having raw data smaller than "+a2" and greater than "+a1" as the second group GR2. Likewise, the reference value selector 227 may classify PUF cells having raw data smaller than "+a1" and greater than "0" as the third group GR3, may classify PUF cells having raw data smaller than "0" and greater than "−a1" as the fourth group GR4, may classify PUF cells having raw data smaller than "−a1" and greater than "−a2" as the fifth group GR5, and may classify PUF cells having raw data smaller than "−a2" as the sixth group GR6.

In an example embodiment, the plurality of groups GR1 to GR6 may occupy different areas in the distribution illustrated in FIG. 14A or 14B. That is, the numbers of PUF cells included in the plurality of groups GR1 to GR6 may be different. Alternatively, the plurality of groups GR1 to GR6 may occupy the same area in the distribution illustrated in FIG. 14A or 14B. That is, the numbers of PUF cells included in the plurality of groups GR1 to GR6 may be different.

In an example embodiment, a plurality of reference values may be variously set. For example, as illustrated in FIG. 14A, a plurality of reference values RV3, RV2, RV1/RV6, RV5, and RV4 may be set to be the same as values (e.g., −a2, −a1, 0, +a1, and +a2) that are used to divide the plurality of PUF cells into the plurality of groups GR1 to GR6. Alternatively, as illustrated in FIG. 14B, a plurality of reference values RV3', RV2', RV5', and RV4' may be set to be different than the values (e.g., −a2, −a1, 0, +a1, and +a2) that are used to divide the plurality of PUF cells into the plurality of groups GR1 to GR6.

In an example embodiment, the plurality of reference values may have a magnitude relationship of "RV3>RV2>RV1 (RV6)>RV5>RV4".

In an example embodiment, the first reference value RV1 may be used to determine the target bit TB with regard to PUF cells included in the first group GR1. In this case, even though sensing data from the PUF cells included in the first group GR1 are changed due to various ambient factors, the probability that the sensing data are smaller than the first reference value RV1 may be very low. That is, even though the sensing data from the PUF cells included in the first group GR1 are changed due to various ambient factors, the determined target bit TB may be maintained to be the same as bit "1".

As another example, the fourth reference value RV4 may be used to determine the target bit TB with regard to PUF cells included in the fourth group GR4. In this case, even though sensing data from the PUF cells included in the fourth group GR4 are changed due to various ambient factors, the probability that the sensing data are larger than the fourth reference value RV4 may be very low. That is, even though the sensing data from the PUF cells included in the fourth group GR4 are changed due to various ambient factors, the determined target bit TB may be maintained to be the same as bit "0". A way to maintain the target bit TB by applying different reference values to other groups GR2, GR3, GR5, and GR6 is similar to that described above, and thus, additional description will be omitted to avoid redundancy.

As described above, the reliability of the security device (or the reliability of a security key) may be improved by applying different reference values to the plurality of groups GR1 to GR6, respectively. Embodiments of the inventive concepts are described above with reference to a specific number of groups and a specific number of reference values, but the inventive concepts are not limited thereto. The above configurations may be variously changed or modified without departing from the technical idea of the inventive concepts.

Figure 15:
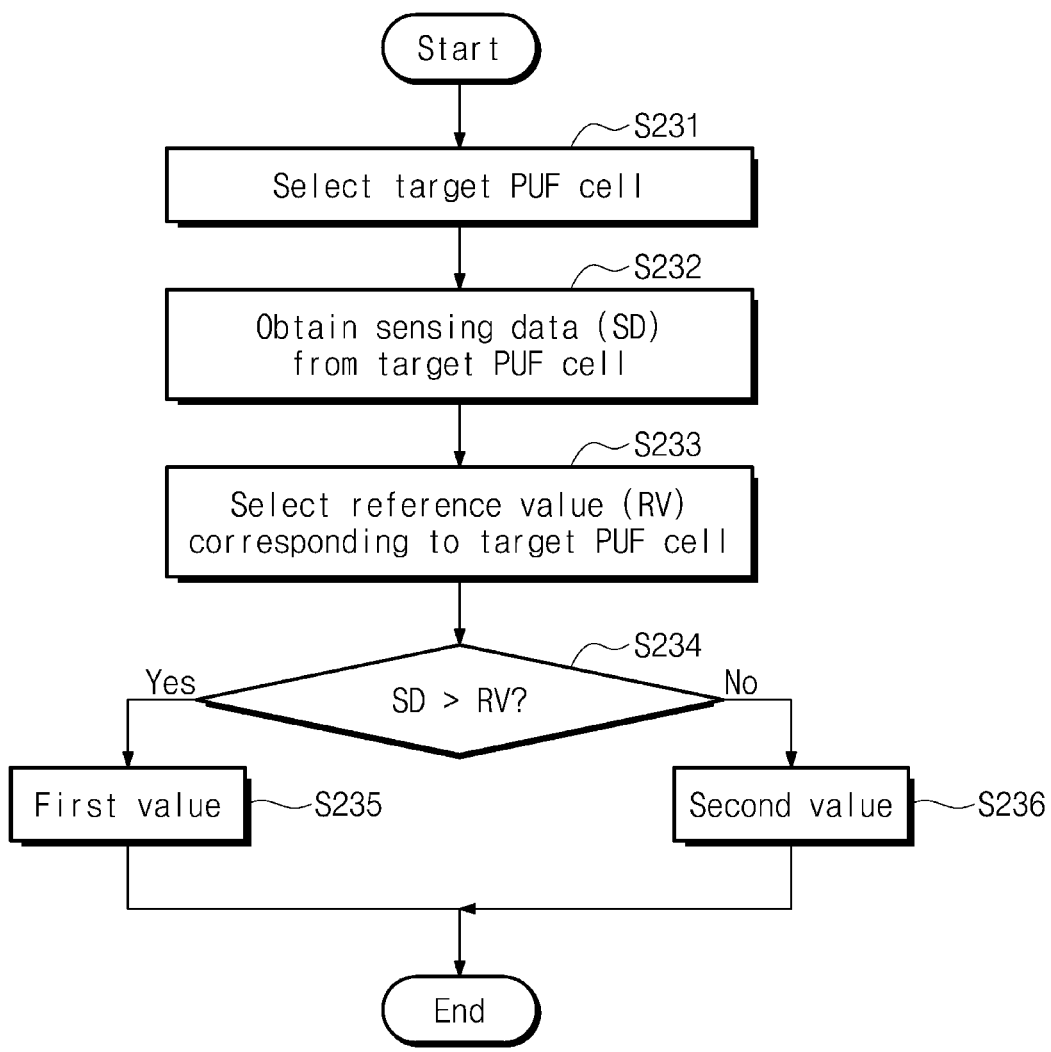
FIG. 15 is a flowchart illustrating an operation of a controller of FIG. 12.

FIG. 15 is a flowchart illustrating an operation of a controller of FIG. 12. An operation in which the controller 220 determines the target bit TB corresponding to a target PUF cell will be described with reference to FIG. 15. It is assumed that the controller 220 stores the sorted list LT_s described with reference to FIG. 4 in the memory 223 before performing an operation according to the flowchart of FIG. 15.

Referring to FIGS. 12 and 15, in operation S231, the controller 220 selects a target PUF cell of a plurality of PUF cells. In operation S232, the controller 220 reads sensing data from the target PUF cell.

In operation S233, the controller 220 selects the reference value RV corresponding to the target PUF cell. For example, as described with reference to FIGS. 13, 14A, and 14B, the reference value selector 227 of the controller 220 may divide the plurality of PUF cells into a plurality of groups based on the sorted list LT_s. The reference value selector 227 may select a group in which the target PUF cell is included and may select a reference value corresponding to the selected group. In detail, referring to FIG. 13, for example when the target PUF cell is the PUF cell of the seventh index ID07, the reference value selector 227 may select the third reference value RV3.

In operation S234, the controller 220 compares the sensing data SD obtained from the target PUF cell with the reference value RV. When the sensing data SD is greater than the reference value RV (Yes in S234), thereafter in operation S235 the controller 220 determines the target bit TB corresponding to the target PUF cell as a first value (e.g., bit "1"). When the sensing data SD is smaller than the reference value RV (No in S234), thereafter in operation S236 the controller 220 determines the target bit TB corresponding to the target PUF cell as a second value (e.g., bit "0").

Although not illustrated in drawings, the controller 220 may generate the target bit TB corresponding to each of a plurality of PUF cells by performing an operation according to the flowchart of FIG. 15 with respect to each of the plurality of PUF cells and may generate the final security key PUF_KEY by combining a plurality of target bits.

Figure 16:
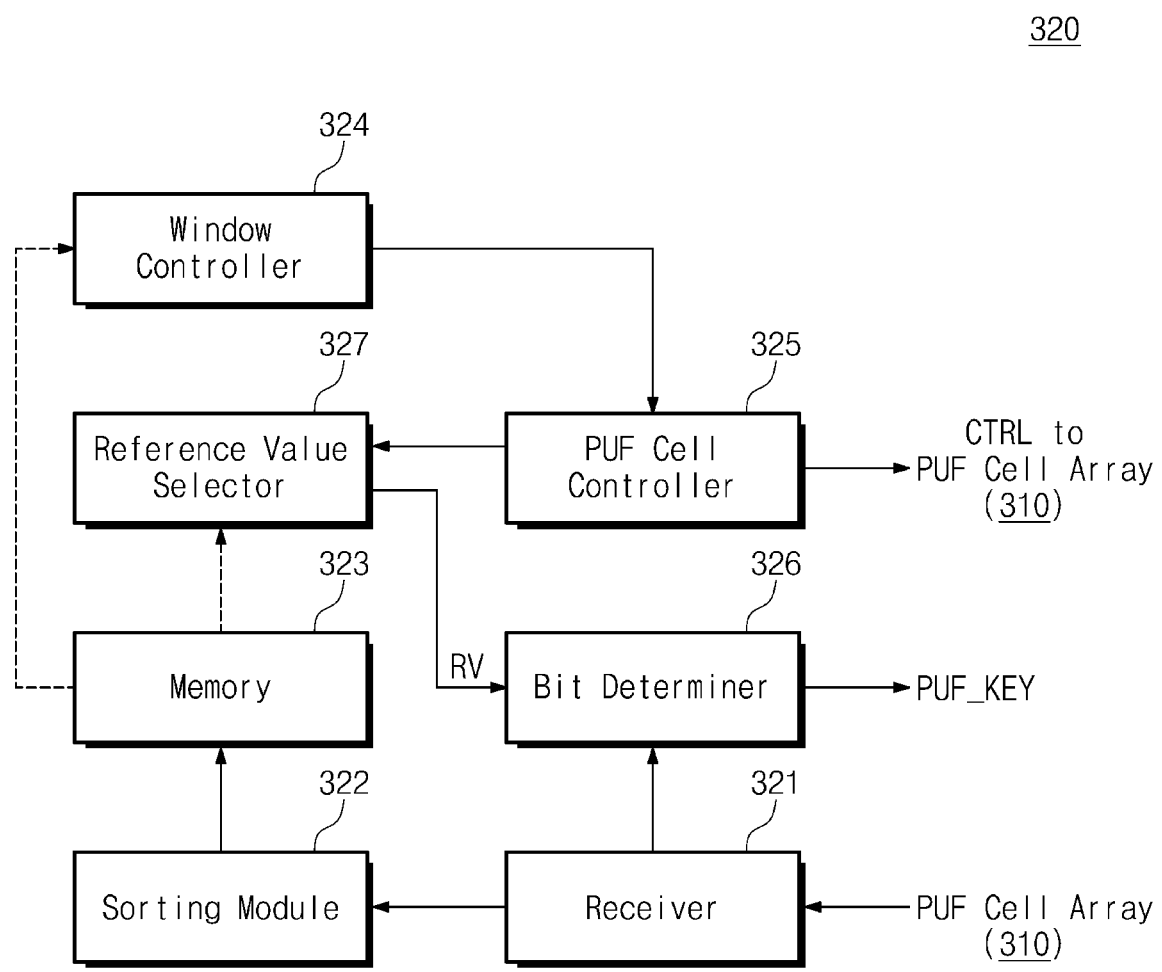
FIG. 16 is a block diagram illustrating a controller of a security device according to an embodiment of the inventive concepts.
Figure 17:
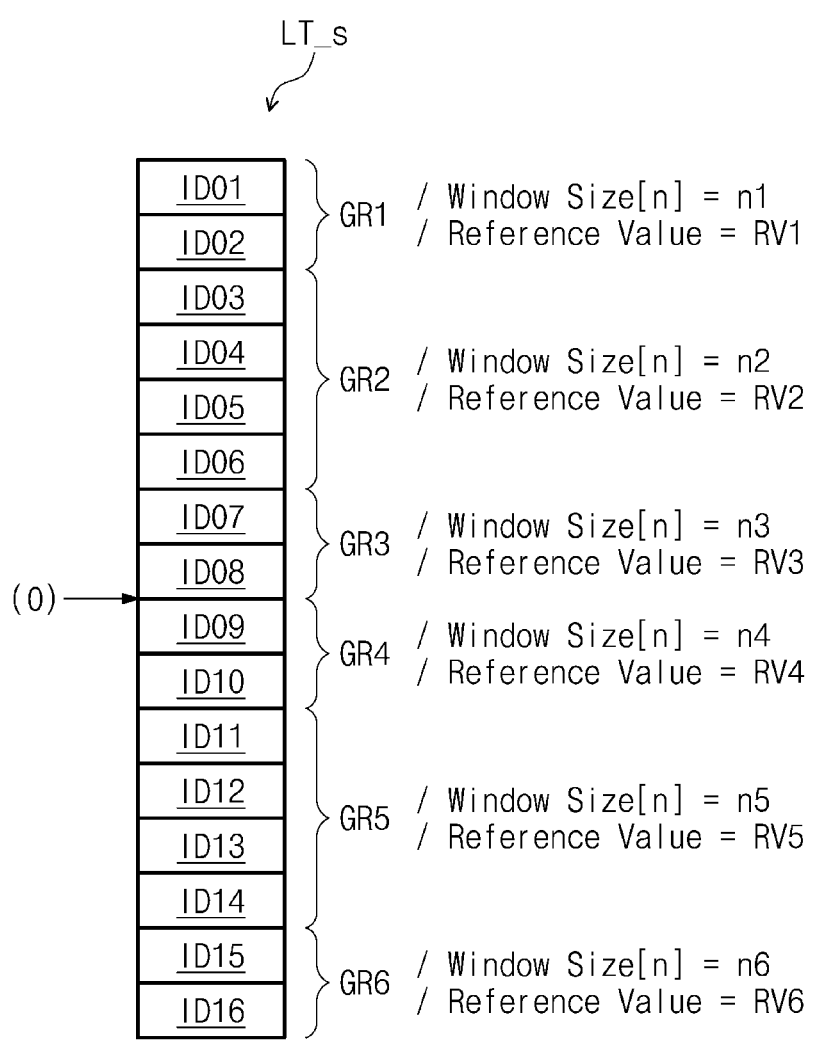
FIG. 17 is a diagram descriptive of an operation of a controller of FIG. 16.

FIG. 16 is a block diagram illustrating a controller of a security device according to an embodiment of the inventive concepts. FIG. 17 is a diagram descriptive of an operation of a controller of FIG. 16. Referring to FIGS. 16 and 17, a controller 320 may include a receiver 321, a sorting module 322, a memory 323, a window controller 324, a PUF cell controller 325, and a bit determiner 326. Each of the above noted components in the controller 320 have been previously described with reference to either of FIGS. 3 and 12, and thus additional description of such similar components will be omitted from the following to avoid redundancy.

The controller 320 may divide the sorted list LT_s into a plurality of groups and may select reference PUF cells by applying a variable window to each of the divided groups. The controller 320 may obtain sensing data from the target PUF cell and the reference PUF cells. The controller 320 may determine the target bit TB corresponding to the target PUF cell based on the sensing data and a reference value corresponding to a group in which the target PUF cell or the reference PUF cells are included.

For example, as illustrated in FIG. 17, the window controller 324 may divide a plurality of PUF cells into the plurality of groups GR1 to GR6 based on the sorted list LT_s and may select the reference PUF cells corresponding to the target PUF cell by applying a window or a variable window to each of the plurality of groups GR1 to GR6. An operation of selecting the reference PUF cells based on the variable window is similar to the operation of the controller 120 described with reference to FIGS. 1 to 9, and thus additional description will be omitted to avoid redundancy.

A reference value selector 327 may divide the plurality of PUF cells into the plurality of groups GR1 to GR6 based on the sorted list LT_s. and the reference value selector 327 may apply different reference values to the plurality of groups GR1 to GR6, respectively.

In detail, when PUF cells (i.e., PUF cells corresponding to ID01 and ID02) included in the first group GR1 are selected as target PUF cells, reference PUF cells may be selected by using a variable window of "n1", and the first reference value RV1 may be selected as a reference value. When PUF cells (i.e., PUF cells corresponding to ID03 to ID06) included in the second group GR2 are selected as target PUF cells, reference PUF cells may be selected by using a variable window of "n2", and the second reference value RV2 may be selected as a reference value. When PUF cells (i.e., PUF cells corresponding to ID07 and ID08) included in the third group GR3 are selected as target PUF cells, reference PUF cells may be selected by using a variable window of "n3", and the third reference value RV3 may be selected as a reference value. When PUF cells (i.e., PUF cells corresponding to ID09 and ID10) included in the fourth group GR4 are selected as target PUF cells, reference PUF cells may be selected by using a variable window of "n4", and the fourth reference value RV4 may be selected as a reference value. When PUF cells (i.e., PUF cells corresponding to ID11 to ID14) included in the fifth group GR5 are selected as target PUF cells, reference PUF cells may be selected by using a variable window of "n5", and the fifth reference value RV5 may be selected as a reference value. When PUF cells (i.e., PUF cells corresponding to ID15 and ID16) included in the sixth group GR6 are selected as target PUF cells, reference PUF cells may be selected by using a variable window of "n6", and the sixth reference value RV6 may be selected as a reference value.

The bit determiner 326 may determine the target bit TB corresponding to the target PUF cell based on sensing data obtained from the target PUF cell and the reference PUF cells, and a reference value selected by the reference value selector 327. An operation of the bit determiner 326 will be more fully described with reference to drawings below.

As described previously, the security device 100 according to an embodiment of the inventive concepts may divide a plurality of PUF cells into a plurality of groups, may apply a variable window to each of the plurality of groups to select reference PUF cells, and may determine the target bit TB corresponding to a target PUF cell by using a reference value corresponding to each of the plurality of groups. Accordingly, the reliability of the security device 100 may be improved.

Figure 18A:
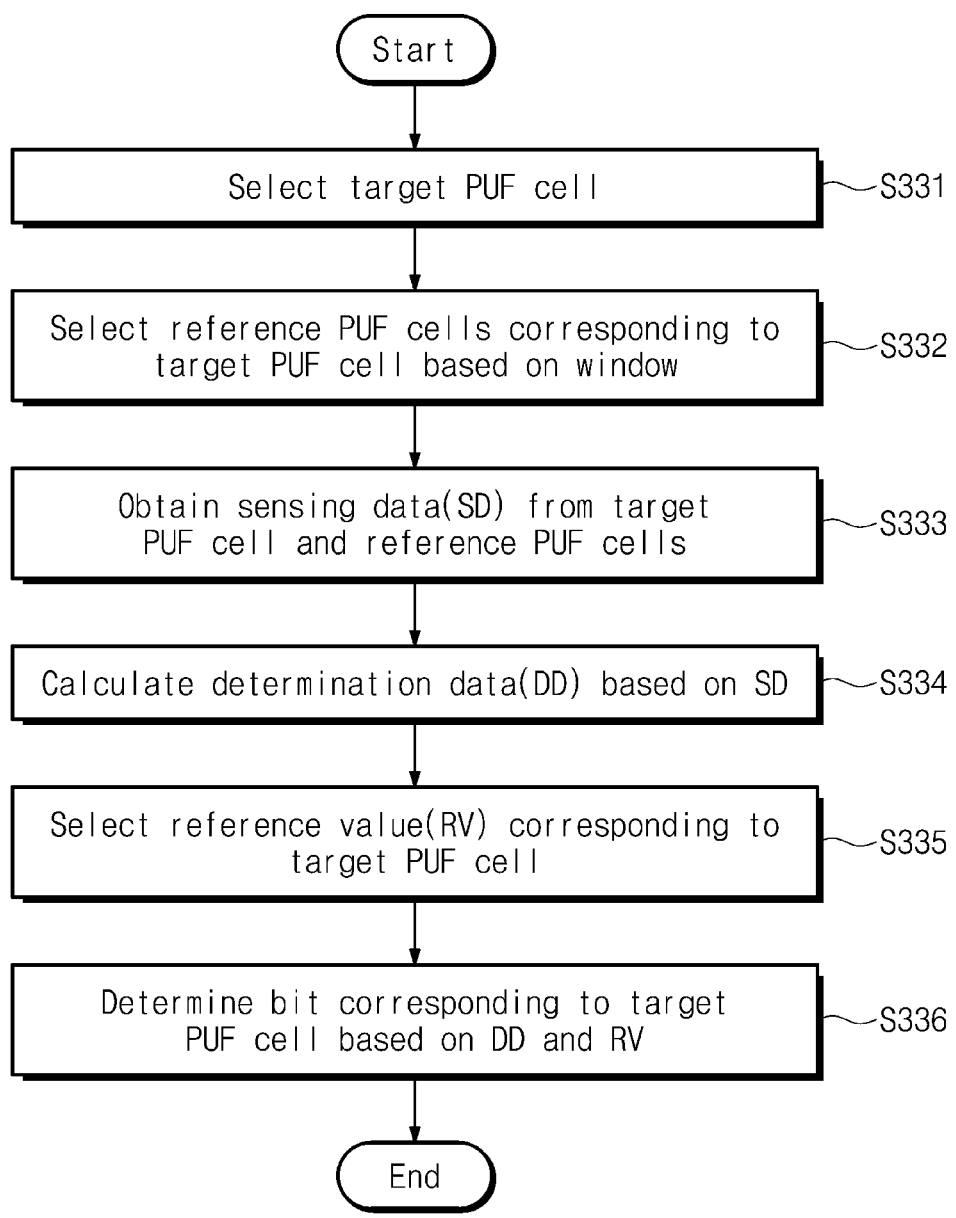
FIG. 18A is a flowchart descriptive of an operation of a controller of FIG. 16 (i.e., an operation of determining a target bit).
Figure 18B:
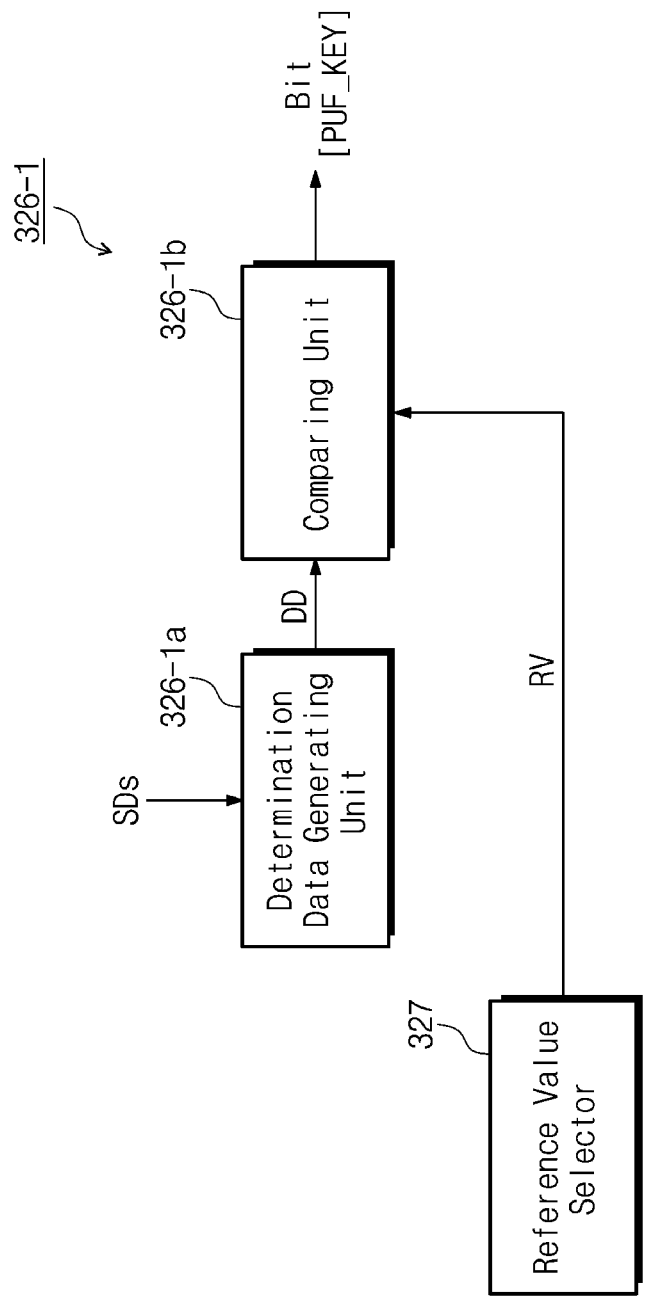
FIG. 18B is a block diagram descriptive of an operation of a controller of FIG. 16 (i.e., an operation of determining a target bit).

FIG. 18A is a flowchart descriptive of an operation of a controller of FIG. 16 (i.e., an operation of determining the target bit TB), and FIG. 18B is a block diagram descriptive of an operation of a controller of FIG. 16 (i.e., an operation of determining the target bit TB). Referring to FIGS. 16, 18A, and 18B, the controller 320 may perform operation S331 to operation S333. Operation S331 to operation S333 are similar to operation S131 to operation S133 of FIG. 6, and thus additional description will be omitted to avoid redundancy.

In operation S334, the controller 320 generates the determination data DD based on the sensing data SD. In operation S335, the controller 320 selects the reference value RV corresponding to a target PUF cell from among a plurality of reference values. In operation S336, the controller 320 determines the target bit TB corresponding to the target PUF cell based on the determination data DD and the selected reference value RV.

For example, as illustrated in FIG. 18B, a bit determiner 326-1 may include a determination data generating unit (or circuit) 326-1a and a comparing unit (or circuit) 326-1b. The determination data generating unit 326-1a may generate the determination data DD based on sensing data SD obtained from the target PUF cell and the reference PUF cells. In an example embodiment, the determination data DD may be data to be compared with the selected reference value RV which may be an intermediate value or an average value of the sensing data SD. For example, determination data generating unit 326-1a may generate the determination data DD in a manner similar as described with respect to FIGS. 10A and 10B.

The comparing unit 326-1b may receive the determination data DD from the determination data generating unit 326-1a and may receive the selected reference value RV from the reference value selector 327. The comparing unit 326-1b may compare the determination data DD with the selected reference value RV to determine the target bit TB corresponding to the target PUF cell.

In an example embodiment, the controller 320 may determine a plurality of target bits by performing the above-described operation on each of the plurality of PUF cells, and the security key PUF_KEY may be generated by combining the plurality of target bits.

As described above, according to an embodiment of the inventive concepts, even though sensing data corresponding to the target PUF cell may be changed due to various ambient factors, because the determination data DD are generated based on the sensing data SD obtained from the target PUF cell and the reference PUF cells, the influence due to a change in sensing data corresponding to the target PUF cell may decrease. Also, as there is selected a reference value corresponding to the target PUF cell from among a plurality of reference values, the probability that an error occurs in the target bit TB corresponding to the target PUF cell may decrease.

Figure 19A:
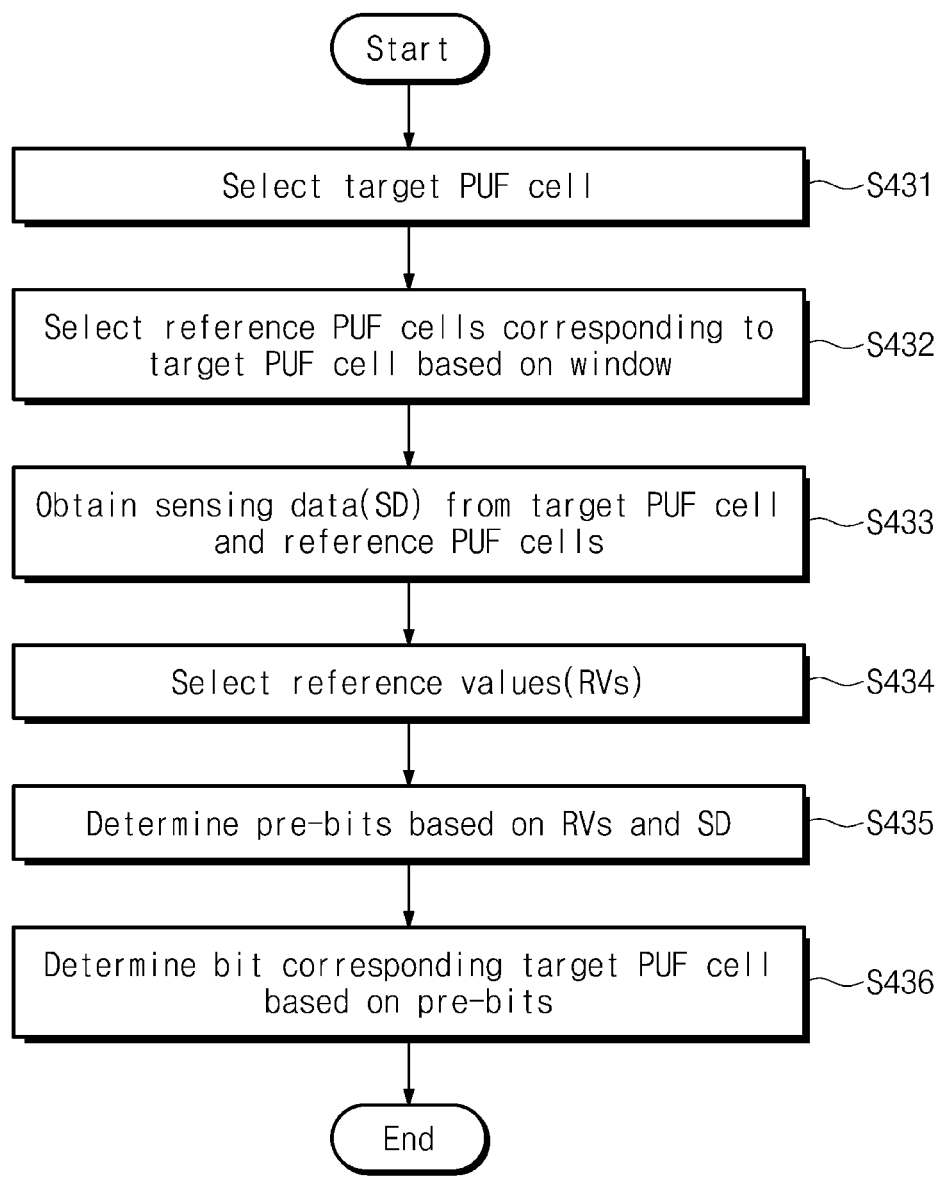
FIG. 19A is a flowchart descriptive of an operation of a controller of FIG. 16 (i.e., an operation of determining a target bit).
Figure 19B:
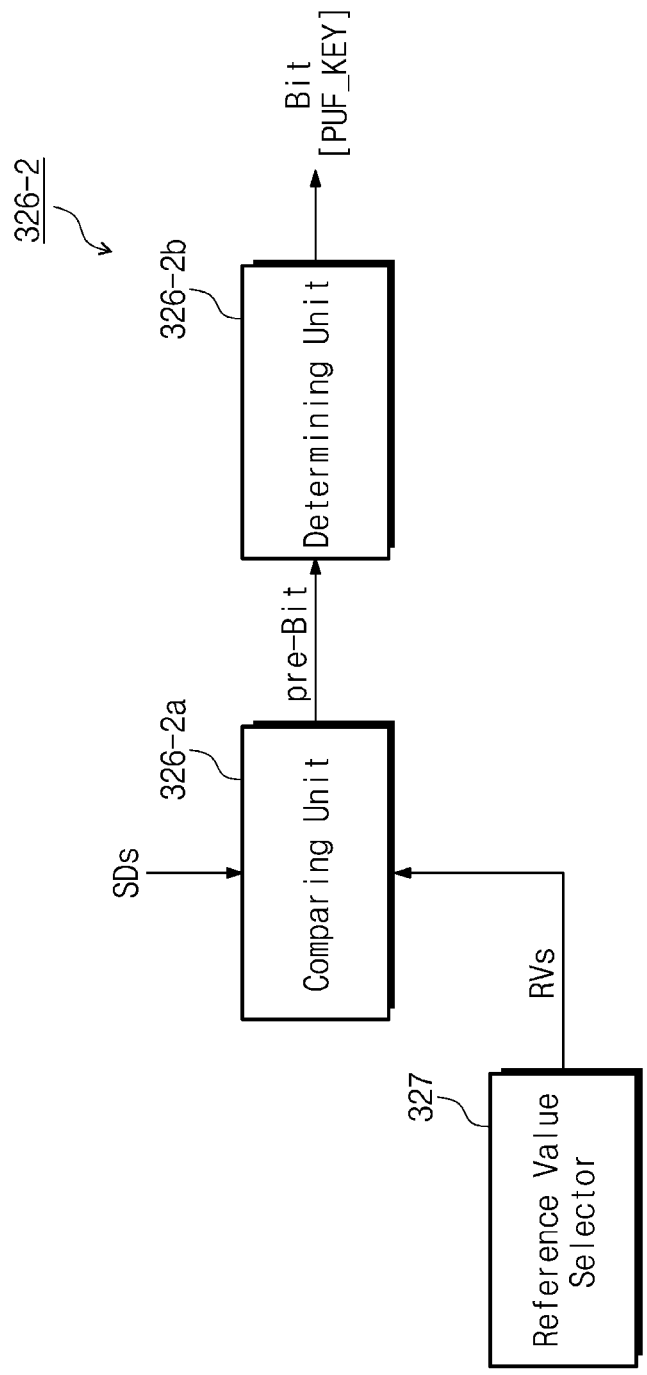
FIG. 19B is a block diagram descriptive of an operation of a controller of FIG. 16 (i.e., an operation of determining a target bit).

FIG. 19A is a flowchart descriptive of an operation of a controller of FIG. 16 (i.e., an operation of determining the target bit TB), and FIG. 19B is a block diagram descriptive of an operation of a controller of FIG. 16 (i.e., an operation of determining the target bit TB). Referring to FIGS. 16, 19A, and 19B, the controller 320 may perform operation S431 to operation S433. Operation S431 to operation S433 are similar to operation S131 to operation S133 of FIG. 6, and thus additional description will be omitted to avoid redundancy.

In operation S434, the controller 320 selects reference values RV. For example, the controller 320 selects the reference value(s) RV corresponding to each of the target PUF cell and the reference PUF cells from among a plurality of reference values. That is, the target PUF cell and the reference PUF cells may correspond to respective different reference values RV. In operation S435, the controller 320 generates the pre-bits PB based on the sensing data SD obtained from the target PUF cell and the reference PUF cells and the selected reference value(s) RV. In operation S436, the controller 320 determines the target bit TB corresponding to the target PUF cell based on the pre-bits PB.

For example, as illustrated in FIG. 19B, a bit determiner 326-2 may include a comparing unit (or circuit) 326-2a and a determining unit (or circuit) 326-2b. The comparing unit 326-2a may receive the sensing data SD obtained from the target PUF cell and the reference PUF cells and may receive the reference value(s) RV from the reference value selector 327. As noted above, respective different reference values RV for the target PUF cell and the reference PUF cells may be provided to comparing unit 326-2a. The comparing unit 326-2a may generate the pre-bits PB by comparing each of the plurality of sensing data SDs with the corresponding one of the reference values RV.

In detail, with respect to FIG. 17 it is for example assumed that the PUF cell of the sixth index ID06 is selected as a target PUF cell and PUF cells of the fifth and seventh indexes ID05 and ID07 are selected as reference PUF cells. In this case, the reference value selector 327 may select the second reference value RV2 as a reference value for the target PUF cell of the sixth index ID06, and may respectively select the second and third reference values RV2 and RV3 as reference values for the reference PUF cells of the fifth and seventh indexes ID05 and ID07. The comparing unit 326-2a may compare sensing data obtained from the target PUF cell of the sixth index ID06 with the second reference value RV2, and may respectively compare sensing data obtained from the reference PUF cells of the fifth and seventh indexes ID05 and ID07 with the second and third reference values RV2 and RV3. The comparing unit 326-2a may generate the pre-bits PB based on comparison results. A way to determine the pre-bits PB is described with reference to FIGS. 11A and 11B, and thus additional description will be omitted to avoid redundancy.

The determining unit 326-2b may determine the target bit TB corresponding to the target PUF cell based on the pre-bits PB. An operation of the determining unit 326-2b is similar to that of the determining unit 126-2b of FIG. 11B, and thus additional description will be omitted to avoid redundancy.

In an example embodiment, the controller 320 may determine a plurality of target bits TB by performing the above-described operation on each of the plurality of PUF cells, and may generate the security key PUF_KEY by combining the plurality of target bits TB.

As described above, according to an embodiment of the inventive concepts, even though sensing data corresponding to the target PUF cell may be changed due to various ambient factors, the influence due to a change in the sensing data corresponding to the target PUF cell may decrease by generating pre-bits through comparison of the sensing data SD obtained from the target PUF cell and the reference PUF cells with the corresponding reference values. Also, because the target bit TB corresponding to the target PUF cell is determined by using the pre-bits, even though a polarity of the target PUF cell or other reference PUF cells may be changed, the probability that an error occurs in the target bit TB corresponding to the target PUF cell may decrease. Accordingly, a security device having improved reliability is provided.

Figure 20:
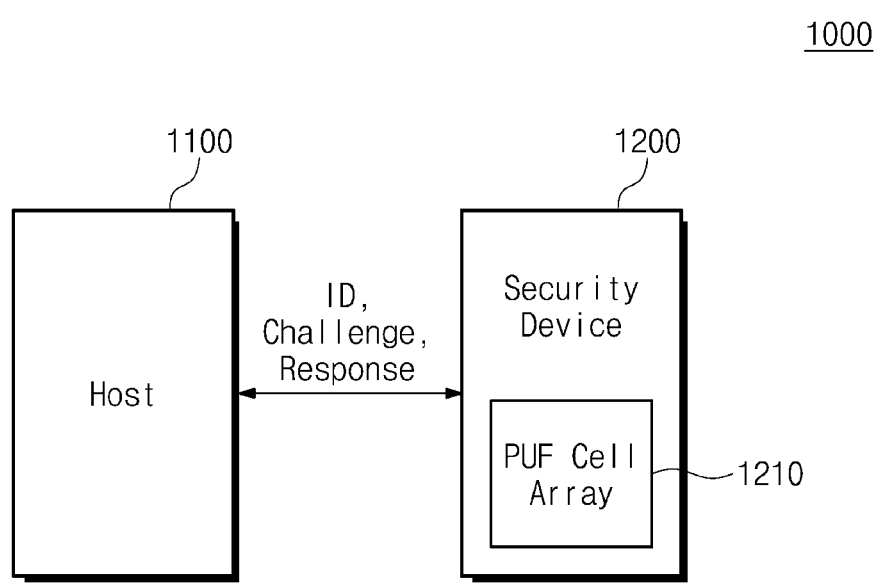
FIG. 20 is a block diagram illustrating an electronic system to which a security device according to an embodiment of the inventive concepts is applied.

FIG. 20 is a block diagram illustrating an electronic system to which a security device according to an embodiment of the inventive concepts may be applied. Referring to FIG. 20, an electronic system 1000 may include a host 1100 and a security device 1200. The electronic system 1000 may be an electronic device such as for example a portable communication terminal, a personal digital assistant (PDA), a portable multimedia player (PMP), a smartphone, a digital camera, or a wearable device, among other various types of electronic devices.

The host 1100 may be configured to control the security device 1200. The security device 1200 may include a PUF cell array 1210 and may be configured to operate under control of the host 1100. In an example embodiment, the security device 1200 for example may be a smart card such as an IC card or a chip card or may indicate a hardware component separately provided to generate a security key.

For example, the host 1100 may receive a device identifier ID from the security device 1200. The host 1100 may transmit a challenge to the security device 1200 based on the received device identifier ID. The security device 1200 may transmit a response to the host 1100 in response to the challenge from the host 1100. In an example embodiment, the response may be the security key PUF_KEY described with reference to FIGS. 1 to 19B. That is, depending on the operation method described with reference to FIGS. 1 to 19B, the security device 1200 may obtain data, which may be based on the challenge from the host 1100, from a plurality of PUF cells included in the PUF cell array 1210, may generate the response (i.e., a security key) based on the obtained data, and may transmit the response to the host 1100. The host 1100 may perform an authentication operation on the security device 1200 or any other devices based on the received response.

According to embodiments of the inventive concepts, a security device with improved reliability is provided.

While the inventive concepts have been described with reference to example embodiments thereof, it will be apparent to those of ordinary skill in the art that various changes and modifications may be made thereto without departing from the spirit and scope of the inventive concepts as set forth in the following claims.

What is claimed is:

1. An operation method of a security device including a controller and a plurality of physical unclonable function (PUF) cells, the method comprising the controller:
   selecting a target PUF cell from among the plurality of PUF cells;
   selecting at least two reference PUF cells other than the target PUF cell from among the plurality of PUF cells based on a sorted list of the plurality of PUF cells;
   reading a plurality of sensing data from the target PUF cell and the at least two reference PUF cells;
   determining a target bit corresponding to the target PUF cell based on the plurality of sensing data to provide a determined target bit; and
   generating a security key based on the determined target bit,
   wherein the selecting of the at least two reference PUF cells comprises:
   setting a window in the sorted list, the window including a physical address of the target PUF cell; and
   selecting at least two PUF cells corresponding to physical addresses included in the window in the sorted list as the reference PUF cells,
   wherein parameters associated with a window size, a skip size, and a window direction of the window are determined based on a logical order of the physical address of the target PUF cell in the sorted list.

2. The method of claim 1, wherein each of the plurality of sensing data includes mismatch information corresponding to respective ones of the target PUF cell and the at least two reference PUF cells.

3. The method of claim 1, wherein the sorted list includes information about physical addresses of the plurality of PUF cells, and
   wherein a logical order of the physical addresses in the sorted list is sorted by an order of size of raw data of the plurality of PUF cells.

4. The method of claim 3, wherein the raw data of the plurality of PUF cells are obtained in a test process or a process of manufacturing the security device.

5. The method of claim 3, wherein physical addresses of the at least two reference PUF cells are logically adjacent to a physical address of the target PUF cell in the sorted list.

6. The method of claim 1, wherein the plurality of PUF cells are divided into a plurality of groups based on the sorted list,
   wherein, when the target PUF cell is included in a first group of the plurality of groups, a number of the at least two reference PUF cells in the first group is "n" (n being an integer of 2 or more), and
   wherein, when the target PUF cell is included in a second group of the plurality of groups, a number of the at least two reference PUF cells in the first group is "m" (m being an integer more than n).

7. The method of claim 6, wherein a reliability of PUF cells included in the first group from among the plurality of PUF cells is higher than a reliability of PUF cells included in the second group from among the plurality of PUF cells.

8. The method of claim 1, wherein the determining of the target bit corresponding to the target PUF comprises:
generating determination data based on the plurality of sensing data; and
determining the target bit based on the determination data.

9. The method of claim 8, wherein the determination data includes first data n times greater than sensing data having a greatest absolute value from among the plurality of sensing data, and second data that is a sum of remaining sensing data of the plurality of sensing data other than the sensing data having the greatest absolute value, wherein n is a number of the remaining sensing data, and
wherein the target bit is determined as a first value when the first data is greater than the second data, and the target bit is determined as a second value different from the first value when the first data is smaller than the second data.

10. The method of claim 1, wherein the determining of the target bit corresponding to the target PUF cell comprises:
comparing a reference value with each of the plurality of sensing data to generate a plurality of pre-bits respectively corresponding to the plurality of sensing data; and
determining the target bit based on the plurality of pre-bits.

11. An operation method of a security device including a controller and a plurality of physical unclonable function (PUF) cells, the method comprising the controller:
reading raw data from each of the plurality of PUF cells;
generating a sorted list by sorting physical addresses respectively associated with the plurality of PUF cells in an order of size of the raw data and storing the sorted list;
selecting a target PUF cell of the plurality of PUF cells;
selecting at least two reference PUF cells corresponding to the target PUF cell based on the sorted list;
reading a plurality of sensing data from the target PUF cell and the at least two reference PUF cells;
determining a target bit corresponding to the target PUF cell based on the plurality of sensing data; and
generating a security key based on the determined target bit,
wherein the selecting of the at least two reference PUF cells comprises:
setting a window in the sorted list, the window including a physical address of the target PUF cell; and
selecting at least two PUF cells corresponding to physical addresses included in the window in the sorted list as the reference PUF cells,
wherein parameters associated with a window size, a skip size, and a window direction of the window are determined based on a logical order of the physical address of the target PUF cell in the sorted list.

12. The method of claim 11, wherein the sorted list includes only physical addresses of the plurality of PUF cells, and
wherein the physical addresses of the plurality of PUF cells in the sorted list are sorted in an order of size of the raw data.

13. A security device comprising:
a PUF cell array including a plurality of physical unclonable function (PUF) cells; and
a controller configured to control the plurality of PUF cells,
wherein the controller comprises
a memory configured to store a sorted list including physical addresses of the plurality of PUF cells,
a window controller configured to select a target PUF cell from among the plurality of PUF cells and to select at least two reference PUF cells corresponding to the target PUF cell from among the plurality of PUF cells, based on the sorted list,
a PUF cell controller configured to control the target PUF cell and the at least two reference PUF cells,
a receiver configured to receive a plurality of sensing data from the target PUF cell and the at least two reference PUF cells, and
a bit determiner configured to receive the plurality of sensing data from the receiver and to determine a target bit corresponding to the target PUF cell based on the plurality of sensing data,
wherein the window controller is configured to select the at least two reference PUF cells by setting a window corresponding to the target PUF cell to the sorted list, and
wherein the window controller is further configured to vary a window size of the window in the sorted list depending on a logical location of a physical address of the target PUF cell.

14. The security device of claim 13, wherein the plurality of sensing data received from the target PUF cell and the at least two reference PUF cells are analog information, and
the receiver includes an analog-to-digital converter configured to convert the analog information to digital information, and the receiver outputs the digital information to the bit determiner as the plurality of sensing data.

* * * * *